(12) United States Patent
Mitchell et al.

(10) Patent No.: US 10,633,464 B2
(45) Date of Patent: Apr. 28, 2020

(54) NON-PHTHALATE CATALYST SYSTEM AND ITS USE IN THE POLYMERIZATION OF OLEFINS

(71) Applicant: BRASKEM AMERICA, INC., Philadelphia, PA (US)

(72) Inventors: Brandi Mitchell, Glenshaw, PA (US); Craig Meverden, Pittsburgh, PA (US)

(73) Assignee: BRASKEM AMERICA, INC., Philadelphia, PA (US)

(*) Notice: Subject to any disclaimer, the term of this patent is extended or adjusted under 35 U.S.C. 154(b) by 0 days.

(21) Appl. No.: 16/067,348

(22) PCT Filed: Dec. 29, 2016

(86) PCT No.: PCT/US2016/069299
§ 371 (c)(1),
(2) Date: Jun. 29, 2018

(87) PCT Pub. No.: WO2017/117443
PCT Pub. Date: Jul. 6, 2017

(65) Prior Publication Data
US 2019/0010264 A1    Jan. 10, 2019

Related U.S. Application Data

(60) Provisional application No. 62/278,256, filed on Jan. 13, 2016, provisional application No. 62/273,584, filed on Dec. 31, 2015.

(51) Int. Cl.
| | | |
|---|---|---|
| *C08F 210/06* | (2006.01) | |
| *C08F 4/649* | (2006.01) | |
| *B01J 31/38* | (2006.01) | |
| *C08F 110/06* | (2006.01) | |

(Continued)

(52) U.S. Cl.
CPC ............ *C08F 4/6494* (2013.01); *B01J 31/38* (2013.01); *C08F 4/022* (2013.01); *C08F 4/651* (2013.01);
(Continued)

(58) Field of Classification Search
None
See application file for complete search history.

(56) References Cited

U.S. PATENT DOCUMENTS

| | | | |
|---|---|---|---|
| 8,778,826 B2 * | 7/2014 | Gonzalez | ............... C08F 10/06 502/107 |
| 2005/0239636 A1 | 10/2005 | Gao et al. | |

(Continued)

FOREIGN PATENT DOCUMENTS

| | | |
|---|---|---|
| CA | 2947095 A1 | 10/2015 |
| EP | 2221320 A1 | 8/2010 |

(Continued)

OTHER PUBLICATIONS

Office Action dated Jan. 24, 2020 in U.S. Appl. No. 16/067,350.

*Primary Examiner* — Catherine S Branch
(74) *Attorney, Agent, or Firm* — Jeffrey N. Townes; Cozen O'Connor

(57) ABSTRACT

This invention relates to a non-phthalate catalyst system for olefin polymerization. The non-phthalate catalyst system comprises (a) a solid Ziegler-Natta catalyst composition comprising a transition metal, a Group 2 metal, and one or more halogens; and one or more internal electron donor compounds; and (b) one or more external electron donor compounds.

34 Claims, 2 Drawing Sheets

(51) Int. Cl.
  *C08F 10/06* (2006.01)
  *C08F 4/02* (2006.01)
  *C08F 4/651* (2006.01)

(52) U.S. Cl.
  CPC ............ *C08F 10/06* (2013.01); *C08F 110/06* (2013.01); *C08F 210/06* (2013.01); *B01J 2231/12* (2013.01); *B01J 2523/22* (2013.01); *B01J 2523/47* (2013.01); *C08F 2500/04* (2013.01); *C08F 2500/12* (2013.01); *C08F 2500/15* (2013.01)

(56) References Cited

U.S. PATENT DOCUMENTS

| | | |
|---|---|---|
| 2007/0027275 A1 | 2/2007 | Chen et al. |
| 2007/0155616 A1 | 7/2007 | Wang et al. |
| 2011/0152481 A1 | 6/2011 | Chang |
| 2011/0207901 A1 | 8/2011 | Chang |
| 2012/0116031 A1 * | 5/2012 | Chang .................... C08F 10/00 526/123.1 |
| 2014/0148565 A1 | 5/2014 | Denkwitz et al. |
| 2014/0275456 A1 | 9/2014 | Xu et al. |
| 2016/0289357 A1 | 10/2016 | Cai et al. |

FOREIGN PATENT DOCUMENTS

| | | |
|---|---|---|
| EP | 2373702 A2 | 10/2011 |
| WO | 2005030815 A1 | 4/2005 |
| WO | 2011160936 A1 | 12/2011 |
| WO | 2012/007430 A1 | 1/2012 |
| WO | 2012052387 A1 | 4/2012 |
| WO | WO-2015077598 A1 * | 5/2015 .............. C08F 10/00 |
| WO | 2015/197435 A1 | 12/2015 |

* cited by examiner

NON-PHTHALATE CATALYST SYSTEM AND ITS USE IN THE POLYMERIZATION OF OLEFINS

This application claims the benefit of priority to U.S. Provisional Patent Application Ser. No. 62/273,584, filed Dec. 31, 2015, and U.S. Provisional Patent Application Ser. No. 62/278,256, filed Jan. 13, 2016; which are hereby incorporated by reference in their entirety.

FIELD OF THE INVENTION

This invention relates to a non-phthalate catalyst system with a novel external electron donor for olefin polymerization.

BACKGROUND OF THE INVENTION

Phthalate-based catalysts have been widely used in the commercial production of polypropylene worldwide. Extensive research and development have shown that the use of certain alkoxysilanes as external donors leads to optimum performance of phthalate-based catalysts (Kissin, *Alkene Polymerizations with Transition Metal Catalysts*, Studies in Surface Science and Catalysis 173: 224-243 (Elsevier, Amsterdam, 2007); Pasquini, *Polypropylene Handbook* (2$^{nd}$ Ed., Hanser Publishers, Munich, 2005); Moore, *The Rebirth of Polypropylene: Supported Catalysts* (Hanser Publishers, Munich, 1998)). The use of these silane donors allows for the production of a wide range of polypropylene products, due to the varied effect of these donors on the hydrogen response (characterized by melt flow rate (MFR)), isotacticity (characterized by % xylene solubles (% XS) or the isotactic pentad contents (mmmm) of the xylene-insoluble fraction (XI)), and molecular weight distribution (MWD).

Yet the use of these phthalate-based catalysts has caused regulatory and human health and safety concerns. Non-phthalate catalysts have been evaluated as replacements for the phthalate-based systems. However, the current non-phthalate catalysts generally do not match the performance of the phthalate systems.

Non-phthalate catalysts have certain limitations compared to the phthalate systems, for instance, very high initial activity, fast decay of polymerization activity, insufficient catalyst activity or low gas phase activity in sequential polymerization process for impact copolymer production. Additionally, non-phthalate catalysts often exhibit one or more of the following characteristics: low hydrogen response (characterized by low MFR) and low isotacticity. These limitations of the non-phthalate catalysts often render the properties of the polymers made with non-phthalate systems poorer than those of the polymers made with the phthalate-based catalysts.

There thus remains a need in the art to improve the technology of these non-phthalate catalyst systems to overcome the above-described limitations in the non-phthalate catalyst systems. This invention answers that need.

SUMMARY OF THE INVENTION

One aspect of the invention relates to a non-phthalate catalyst system for olefin polymerization. The non-phthalate catalyst system comprises (a) a solid Ziegler-Natta catalyst composition comprising a transition metal, a Group 2 metal, and one or more halogens; and one or more internal electron donor compounds; and (b) one or more external electron donor compounds.

The internal electron donor compound is i) a diether compound having a formula of

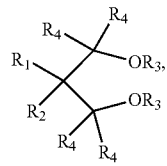

(I)

ii) a diester compound having a formula of

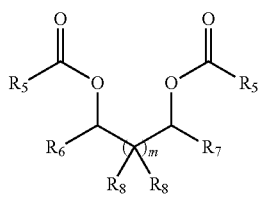

(II), iii) a cyclic diester compound having a formula of

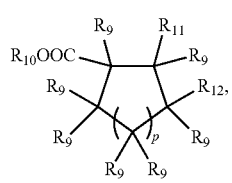

(III)

or iv) a succinate compound having a formula of

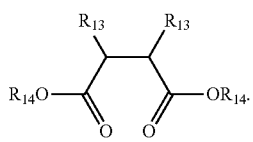

(IV)

In these formulas, each of $R_1$ and $R_2$ is independently H or an alkyl, cycloalkyl, aryl, or aralkyl group, each having from 1 to 18 carbon atoms; or, $R_1$ and $R_2$ together form one or more saturated or unsaturated mono- or poly-cyclic structures. Each $R_3$ is independently an alkyl, aryl, or aralkyl group having from 1 to 18 carbon atoms. Each $R_4$ is H or $R_3$. Each $R_5$ is independently a $C_1$ to $C_{18}$ hydrocarbyl group which can optionally form one or more saturated or unsaturated mono- or poly-cyclic structures. Each of $R_6$ and $R_7$ is independently H or a $C_1$ to $C_{18}$ hydrocarbyl group; or, $R_6$ and $R_7$ together form one or more saturated or unsaturated mono- or poly-cyclic structures. Each $R_8$ is independently absent, H, or a $C_1$ to $C_{18}$ hydrocarbyl group. Each $R_9$ is independently H, halogen, or a $C_1$ to $C_{18}$ hydrocarbyl group. Each $R_{10}$ is independently a $C_1$ to $C_{20}$ hydrocarbyl group. Each of $R_{11}$ and $R_{12}$ is independently $R_9$ or —$COOR_{10}$, provided that at least one of $R_{11}$ and $R_{12}$ is —$COOR_{10}$. Each of $R_{13}$ and $R_{14}$ is independently a $C_1$ to $C_{18}$ hydrocarbyl group. The integer m is 0 or 1. The integer p ranges from 1 to 6. Each of $R_1$, $R_2$, $R_3$, $R_4$, $R_5$, $R_6$, $R_7$, $R_8$, $R_9$, $R_{13}$, and $R_{14}$ can contain one or more heteroatoms, selected from the group consisting of halogens, P, N, O, S, and Si, that replace one or more carbon atoms in the hydrocarbyl group.

The external electron donor compound is i) a triester compound having a formula

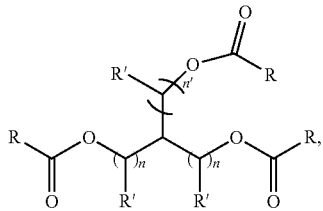

(V)

of ii) a diester compound having a formula of

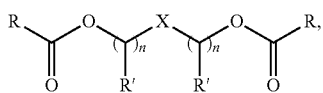

(VI)

or iii) an oxo-substituted diester compound having a formula of

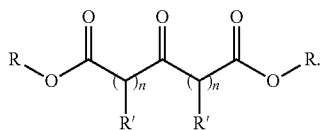

(VII)

In these formulas, X is $CH_2$ or O. Each R is independently a $C_1$-$C_{10}$ hydrocarbyl group. Each R' is independently H or R. Each n is independently an integer from 1 to 4. The integer n' ranges from 0 to 4.

Another aspect of the invention relates to a non-phthalate catalyst system for olefin polymerization. The non-phthalate catalyst system comprises (a) a solid Ziegler-Natta catalyst composition comprising a transition metal, a Group 2 metal, and one or more halogens; and one or more internal electron donor compounds; and (b) one or more external electron donor compounds.

The internal electron donor compound is i) a diester compound having a formula of

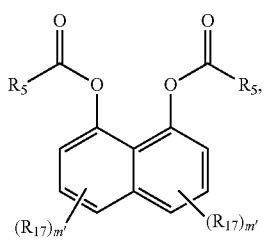

(IIe)

or ii) a cyclic diester compound having a formula of

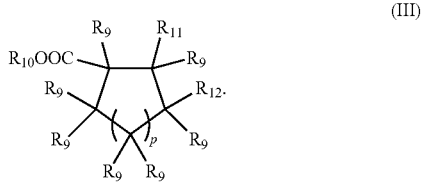

(III)

In these formulas, each $R_5$ is independently a $C_1$ to $C_{18}$ hydrocarbyl group which can optionally form one or more saturated or unsaturated mono- or poly-cyclic structures. Each $R_{17}$ is independently H, halogen, or $C_1$ to $C_{18}$ hydrocarbyl group which can optionally form one or more saturated or unsaturated cyclic structures with the phenyl group it is attached to. Each $R_9$ is independently H, halogen, or $C_1$ to $C_{18}$ hydrocarbyl group. Each $R_{10}$ is independently $C_1$ to $C_{20}$ hydrocarbyl group. Each of $R_{11}$ and $R_{12}$ is independently $R_9$ or —$COOR_{10}$, provided that at least one of $R_{11}$ and $R_{12}$ is —$COOR_{10}$. Each m' is independently an integer from 0 to 5. The integer p ranges from 1 to 6. Each of $R_5$, $R_9$, and $R_{17}$ can contain one or more heteroatoms, selected from the group consisting of halogens, P, N, O, S, and Si, that replace one or more carbon atoms in the hydrocarbyl group.

The external electron donor compound has a formula of

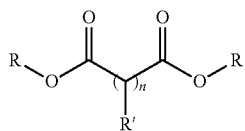

(VIII), wherein the external electron donor compound does not contain an alkoxysilane compound. In formula VIII, each R is independently a $C_1$ to $C_{10}$ hydrocarbyl group, and can contain one or more heteroatoms, selected from the group consisting of halogens, P, N, O, S, and Si, that replace one or more carbon atoms in the hydrocarbyl group. R' is H or R. The integer n ranges from 1 to 10.

Another aspect of the invention relates to a process for preparing a polyolefin. The process comprises polymerizing one or more olefins, in the presence of the non-phthalate catalyst system under reaction conditions sufficient to form the polyolefin. The non-phthalate catalyst system may be any non-phthalate catalyst system described herein.

in combination with a conventional alkoxysilane external donor and non-silane ester external donors, as compared to a phthalate procatalyst (Comparative Example 1) in combination with the conventional alkoxysilane external donor (2-gallon reactor, ratio of donor/Ti compound=10).

Figure 4:
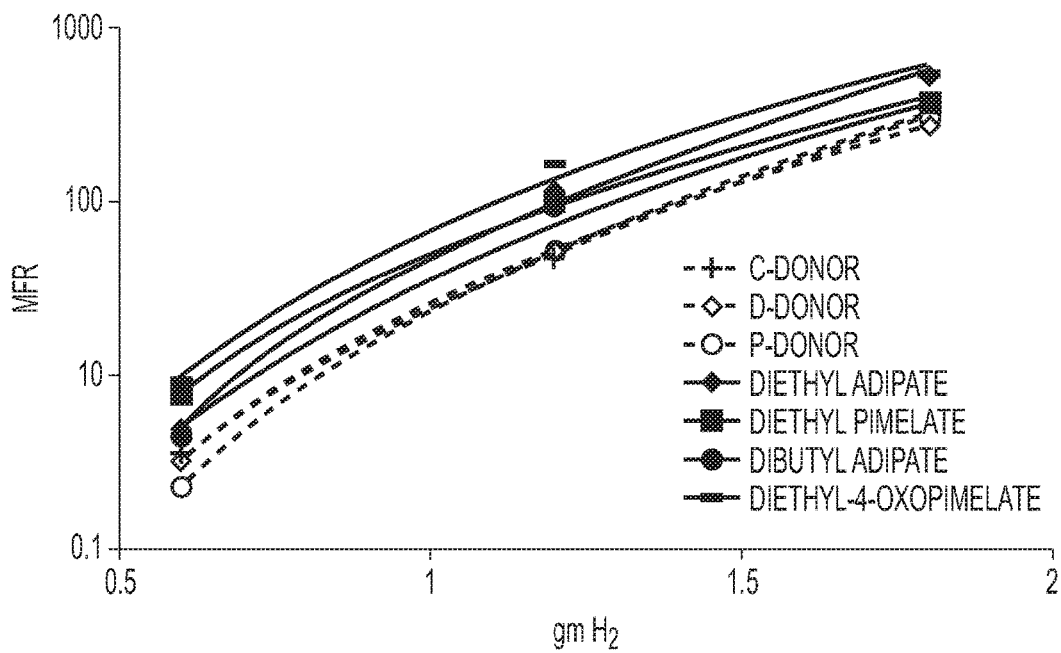

FIG. 4 is a graph showing the hydrogen responses of Example No. 1 procatalyst (non-phthalate) in combination with conventional alkoxysilane external donors and non-silane aliphatic diester external donors (1-gallon reactor, 75° C., ratio of donor/Ti compound=10).

DETAILED DESCRIPTION OF THE INVENTION

This invention relates to a non-phthalate catalyst system capable to produce polyolefins with good catalyst activity, high isotacticity, and increased hydrogen response. Previously, non-phthalate catalyst systems have typically focused on using conventional alkoxysilane external donors. However, the non-phthalate catalysts often respond poorly to the changes in the type of conventional alkoxysilane external donors used, and the conventional alkoxysilane external donors generally have little modifying effect on the performance of the non-phthalate catalysts and the resulting polymer properties. In this invention, the inventors have discovered a series of novel catalyst/non-silane external donor systems that are chemically different from catalyst/alkoxysilane external donor systems. These non-silane external donors can modify the non-phthalate catalysts more significantly than the well-known alkoxysilane external donors and, thus, significantly improving the performance of the resulting polymer.

One aspect of the invention relates to a non-phthalate catalyst system for olefin polymerization. The non-phthalate catalyst system comprises (a) a solid Ziegler-Natta catalyst composition comprising a transition metal, a Group 2 metal, and one or more halogens; and one or more internal electron donor compounds; and (b) one or more external electron donor compounds.

The internal electron donor compound is i) a diether compound having a formula of

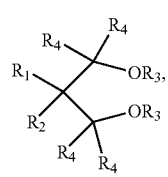

(I)

ii) a diester compound having a formula of

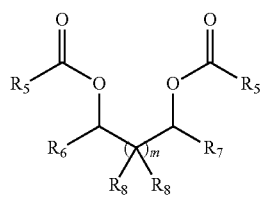

(II), iii) a cyclic diester compound having a formula of

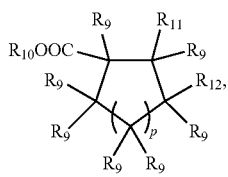

(III)

or iv) a succinate compound having a formula of

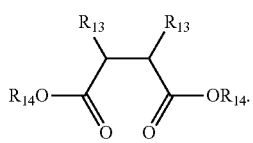

(IV)

In these formulas, each of $R_1$ and $R_2$ is independently H or an alkyl, cycloalkyl, aryl, or aralkyl group, each having from 1 to 18 carbon atoms; or, $R_1$ and $R_2$ together form one or more saturated or unsaturated mono- or poly-cyclic structures. Each $R_3$ is independently an alkyl, aryl, or aralkyl group having from 1 to 18 carbon atoms. Each $R_4$ is H or $R_3$. Each $R_5$ is independently a $C_1$ to $C_{18}$ hydrocarbyl group which can optionally form one or more saturated or unsaturated mono- or poly-cyclic structures. Each of $R_6$ and $R_7$ is independently H or a $C_1$ to $C_{18}$ hydrocarbyl group; or, $R_6$ and $R_7$ together form one or more saturated or unsaturated mono- or poly-cyclic structures. Each $R_8$ is independently absent, H, or a $C_1$ to $C_{18}$ hydrocarbyl group. Each $R_9$ is independently H, halogen, or a $C_1$ to $C_{18}$ hydrocarbyl group. Each $R_{10}$ is independently a $C_1$ to $C_{20}$ hydrocarbyl group. Each of $R_{11}$ and $R_{12}$ is independently $R_9$ or —$COOR_{10}$, provided that at least one of $R_{11}$ and $R_{12}$ is —$COOR_{10}$. Each of $R_{13}$ and $R_{14}$ is independently a $C_1$ to $C_{18}$ hydrocarbyl group. The integer m is 0 or 1. The integer p ranges from 1 to 6. Each of $R_1$, $R_2$, $R_3$, $R_4$, $R_5$, $R_6$, $R_7$, $R_8$, $R_9$, $R_{13}$, and $R_{14}$ can contain one or more heteroatoms, selected from the group consisting of halogens, P, N, O, S, and Si, that replace one or more carbon atoms in the hydrocarbyl group.

The external electron donor compound is i) a triester compound having a formula of

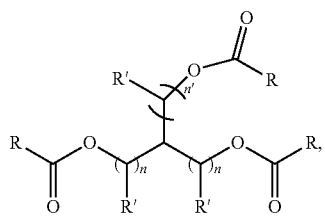

(V)

ii) a diester compound having a formula of

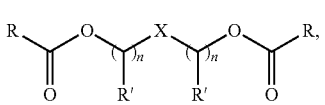

(VI)

or iii) an oxo-substituted diester compound having a formula of

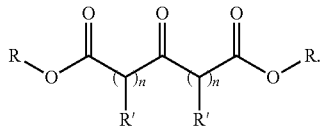

In these formulas, X is $CH_2$ or O. Each R is independently a $C_1$-$C_{10}$ hydrocarbyl group. Each R' is independently H or R. Each n is independently an integer from 1 to 4. The integer n' ranges from 0 to 4.

Solid Ziegler-Nata Catalyst Composition

Catalyst systems for the stereospecific polymerization of olefins are well known in the art. The most common type of catalyst system is the Ziegler-Natta family, which comprises a solid catalyst composition containing a Ziegler-Natta procatalyst composition, an internal electron donor, and an external electron donor.

Any Ziegler-Natta procatalyst known in the art may be used in the non-phthalate catalyst system. For instance, the Ziegler-Natta procatalyst composition typically contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof. In a typical Ziegler-Natta procatalyst composition, the transition metal is titanium, the Group 2 metal is magnesium, and the halogen is chloride.

The transition metal compound may have the general formulas of $TrX_x$ or $Tr(OQ)_gX_{4-g}$. Tr is the transition metal, for instance, Tr may be a Group 4, 5, or 6 metal. In one embodiment, Tr is a Group 4 metal, such as titanium. In another embodiment, Tr is Group 5 metal, such as vanadium. Each Q independently represents a hydrocarbon group, such as a $C_1$-$C_{10}$ alkyl group. X represents a halogen atom, such as chloride, bromide, or iodide; x is an integer from 3 to 4; and g is an integer from 0 to 4. Exemplary transition metal compounds include titanium trihalides such as $TiCl_3$, $TiBr_3$, and $TiI_3$; titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(OC_4H_9)Br_3$; dialkoxytitanium dihalides such as $Ti(OCH_3)_2Cl_2$, $Ti(OC_2H_5)_2Cl_2$, $Ti(OC_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(OC_4H_9)_3Cl$, and $Ti(OC_2H_5)_3Br$; and tetraalkoxytitaniums such as $Ti(OCH_3)_4$, $Ti(OC_2H_5)_4$ and $Ti(OC_4H_9)_4$. Mixtures of two or more such transition metal compounds may be used as well. The transition metal compound may be used individually or in solutions of hydrocarbon compounds or halogenated hydrocarbons.

Suitable Group 2 metal compounds include magnesium halides, such as magnesium chloride and magnesium bromide; alkoxymagnesiums, such as ethoxymagnesium, isopropoxymagnesium, butoxymagnesium, and 2-ethylhexoxymagnesium; dialkoxymagnesiums, such as diethoxymagnesium; alkoxymagnesium halides, such as methoxymagnesium chloride, ethoxymagnesium chloride, isopropoxy magnesium chloride, butoxy magnesium chloride, and octoxy magnesium chloride; magnesium oxyhalides; dialkylmagnesiums; aryloxymagnesiums, such as phenoxymagnesium and methylphenoxy magnesium chloride; and carboxylates of magnesium, such as magnesium laurate and magnesium stearate. These magnesium compounds may be in the liquid or solid state. Typically, the Group 2 metal compound is magnesium dichloride.

Internal Donor

The Ziegler-Natta procatalyst composition includes an internal electron donor. The internal electron donor provides tacticity control and catalyst crystallite sizing. Suitable internal electron donors include diethers, diesters, cyclic diesters, and succinates, and combinations thereof.

As used herein, a "hydrocarbyl" is a linear or branched aliphatic radical, such as alkyl, alkenyl, and alkynyl; alicyclic radical, such as cycloalkyl, cycloalkenyl; aromatic radical, such as monocyclic or polycyclic aromatic radical; as well as combinations thereof, such as alkaryl and aralkyl.

i) Diether Compound

The internal electron donor can be a diether compound, such as a 1,3-diether having a formula of

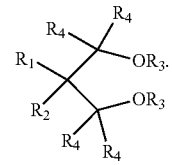

Each of $R_1$ and $R_2$ is independently H or an alkyl, cycloalkyl, aryl, or aralkyl group, each having from 1 to 18 carbon atoms; or, $R_1$ and $R_2$ together form one or more saturated or unsaturated mono- or poly-cyclic structures. Each $R_3$ is independently an alkyl, aryl, or aralkyl group having from 1 to 18 carbon atoms. Each $R_4$ is H or $R_3$. The alkyl, cycloalkyl, and aryl for each R group can be further substituted with one or more of alkyl, cycloalkyl, aryl, or halogen groups. Each of $R_1$, $R_2$, $R_3$, and $R_4$ can contain one or more heteroatoms, selected from the group consisting of halogens, P, N, O, S, and Si, that replace one or more carbon atoms in the hydrocarbyl group. Typically, $R_1$ and $R_2$ are each independently H, $C_1$-$C_6$ alkyl, $C_2$-$C_{10}$ mono- or di-cycloalkyl, phenyl, benzyl, or naphthyl; $R_3$ is a $C_1$-$C_6$ alkyl such as methyl; and $R_4$ is hydrogen.

In some embodiments, when one of $R_1$ and $R_2$ is hydrogen, the other can be ethyl, butyl, 2-ethylhexyl, cyclohexylethyl, diphenylmethyl, p-chlorophenyl, 1-naphthyl, or 1-decahydronaphthyl. In some embodiments, when one of $R_1$ and $R_2$ is methyl, ethyl, or propyl; the other can be ethyl, propyl, butyl, pentyl, 2-ethylhexyl, cyclopentyl, cyclohexyl, methylcyclohexyl, phenyl, or benzyl. In some embodiments, both $R_1$ and $R_2$ can be ethyl, propyl, isopropyl, butyl, pentyl, phenyl, benzyl, cyclohexyl, or cyclopentyl. Exemplary diether compounds include, but are not limited to, 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-di4methoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2 (1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1, 3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis (p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane. Mixtures of two or more such diether compounds may be used as well.

In some embodiments, $R_1$ and $R_2$ together form one or more unsaturated mono- or poly-cyclic structures, such as cyclopentadiene. The resulting diether compound has a formula of

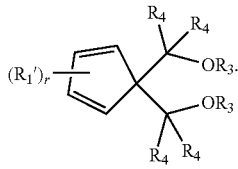

(Ia)

$R_3$ and $R_4$ are defined as above. Each $R_1'$ is independently H, halogen, or an alkyl, cycloalkyl, aryl, or aralkyl group, each having from 1 to 18 carbon atoms; or, two or more of $R_1'$, together with the pentadiene ring, form fused di- or tri-cyclic structures. The alkyl, cycloalkyl, and aryl for each $R_1'$ group can be further substituted with one or more of alkyl, cycloalkyl, aryl, or halogen groups. Each $R_1'$ and its substituent group can optionally contain one or more heteroatoms, selected from the group consisting of halogens, P, N, O, S, and Si, that replace one or more carbon atoms. The integer r ranges from 0 to 4. Typically, $R_3$ is a $C_1$-$C_6$ alkyl such as methyl; and $R_4$ is hydrogen. Typically, each $R_1'$ is H, halogen such as fluoro or chloro; $C_1$-$C_6$ alkyl; $C_2$-$C_6$ cycloalkyl; phenyl; or two of the $R_1'$ groups form an indene with the pentadiene ring. Exemplary pentadiene- or indienecontaining compounds are 1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl) indene; 1,1-bis(methoxymethyl)-2,3-dimethylindene; 1,1-bis(methoxymethyl)-4,5,6,7-tetrahydroindene; 1,1-bis (methoxymethyl)-2,3,6,7-tetrafluoroindene; 1,1-bis (methoxymethyl)-4,7-dimethylindene; 1,1-bis(methoxymethyl)-3,6-dimethylindene; 1,1-bis(methoxymethyl)-4-phenylindene; 1,1-bis(methoxymethyl)-4-phenyl-2-methylindene; 1,1-bis(methoxymethyl)-4-cyclohexylindene; 1,1-bis(methoxymethyl)-7-(3,3,3-trifluoropropyl)indene; 1,1-bis(methoxymethyl)-7-trimethyilsilylindene; 1,1-bis(methoxymethyl)-7-trifluoromethylindene; 1,1-bis(methoxymethyl)-4,7-dimethyl-4,5,6,7-tetrahydroindene; 1,1-bis (methoxymethyl)-7-methylindene; 1,1-bis (methoxymethyl)-7-cyclopentylindene; 1,1-bis (methoxymethyl)-7-isopropylindene; 1,1-bis (methoxymethyl)-7-cyclohexylindene; 1,1-bis (methoxymethyl)-7-tert-butylindene; 1,1-bis (methoxymethyl)-7-tert-butyl-2-methylindene; 1,1-bis (methoxymethyl)-7-phenylindene; 1,1-bis(methoxymethyl)-2-phenylindene; 1,1-bis(methoxymethyl)-1H-benz[e] indene; and 1,1-bis(methoxymethyl)-1H-2-methylbenz[e] indene. Mixtures of two or more such diether compounds may be used as well.

Alternatively, two or more of $R_1'$ groups, together with the pentadiene ring, form fused di- or tri-cyclic structures, such as fluorene. The resulting diether compound has a formula of

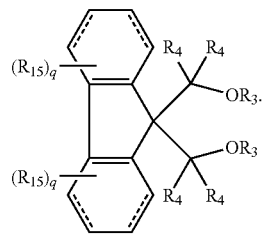

(Ib)

$R_3$ and $R_4$ are defined as above. Each $R_{15}$ is independently H, halogen, or an alkyl, cycloalkyl, aryl, alkylaryl, or aralkyl group, each having from 1 to 18 carbon atoms; or one or more $R_{15}$ groups, together with the benzene ring, form fused rings. The integer q ranges from 0 to 4. The symbol "=====" in the formula refers to a saturated bond or unsaturated bond. Typically, $R_{15}$ is H; halogen such as fluoro or chloro; $C_1$-$C_6$ alkyl; $C_2$-$C_6$ cycloalkyl; or two or more $R_{15}$ form benzofluorene with the benzene ring(s). Exemplary fluorenecontaining diether compounds are 9,9-bis(methoxymethyl) fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; and 9,9-bis(methoxymethyl)-4-tert-butylfluorene. A typical fluorene-containing diether compound is 9,9-bis(methoxymethyl)fluorene. Mixtures of two or more such diether compounds may be used as well.

ii) Diester Compound

The internal electron donor can be a diester compound having a formula of

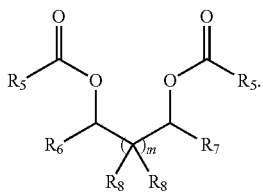

(II)

Each $R_5$ is independently a $C_1$ to $C_{18}$ hydrocarbyl group which can optionally form one or more saturated or unsaturated mono- or poly-cyclic structures. Each of $R_6$ and $R_7$ is independently H or a $C_1$ to $C_{18}$ hydrocarbyl group; or, $R_6$ and $R_7$ together form one or more saturated or unsaturated mono- or poly-cyclic structures. Each $R_8$ is independently absent, H, or a $C_1$ to $C_{18}$ hydrocarbyl group. The integer m is 0 or 1. Each of $R_5$, $R_6$, $R_7$, and $R_8$ can contain one or more heteroatoms, selected from the group consisting of halogens, P, N, O, S, and Si, that replace one or more carbon atoms in the hydrocarbyl group.

$R_5$ can be a $C_1$ to $C_{18}$ alkyl such as $C_1$ to $C_{10}$ alkyl; $C_2$ to $C_{18}$ alkenyl such as $C_2$ to $C_8$ alkenyl; $C_3$ to $C_{18}$ cycloalkyl such as $C_5$ to $C_6$ cycloalkyl; $C_3$ to $C_{18}$ cycloalkenyl such as $C_5$ to $C_6$ cycloalkenyl; aryl such as phenyl; heteroaryl, e.g., 5- or 6-membered ring heteroaryl, containing one or more heteroatoms N, O, or S, such as furanyl; each of these groups can be further substituted by one or more halogen atoms such as chloro or fluoro, $C_1$-$C_{10}$ alkyl, or $C_1$-$C_{10}$ alkyoxy. Each of $R_6$ and $R_7$ can be independently $C_1$-$C_{15}$ alkyl (e.g., $C_1$-$C_{10}$ alkyl or $C_1$-$C_6$ alkyl), $C_6$-$C_{14}$ aryl (e.g., phenyl), $C_3$-$C_{15}$ cycloalkyl (e.g., $C_5$-$C_6$ cycloalkyl), $C_7$-$C_{15}$ arylalkyl (e.g., $C_7$-$C_{12}$ aralkyl), or $C_7$-$C_{15}$ alkylaryl (e.g., $C_7$-$C_{12}$ alkylaryl). Each $R_8$ can be independently absent, hydrogen, $C_1$-$C_{15}$ alkyl (e.g., $C_1$-$C_{10}$ alkyl or $C_1$-$C_6$ alkyl), $C_2$ to $C_{18}$ alkenyl (e.g., $C_2$ to $C_8$ alkenyl), $C_6$-$C_{14}$ aryl (e.g., phenyl, naphthyl, or halophenyl), $C_3$-$C_{15}$ cycloalkyl (e.g., $C_5$-$C_6$ cycloalkyl), $C_7$-$C_{15}$ arylalkyl (e.g., $C_7$-$C_{12}$ aralkyl), or $C_7$-$C_{15}$ alkylaryl (e.g., $C_7$-$C_{12}$ alkylaryl).

In some embodiments, m is 1. The diester compound has a formula of:

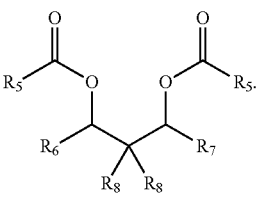

(IIa)

$R_5$, $R_6$, $R_7$, and $R_8$ are defined as above. In certain embodiments, each $R_5$ is independently an aryl. For instance, the diester compound can have a formula of:

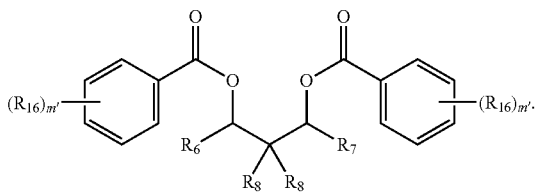

(IIb)

Each $R_{16}$ is independently H, halogen, or a $C_1$ to $C_{18}$ hydrocarbyl group which can optionally form one or more saturated or unsaturated cyclic structures with the phenyl group it attaches to. Each $R_{16}$ can contain one or more heteroatoms, selected from the group consisting of halogens, P, N, O, S, and Si, that replace one or more carbon atoms in the hydrocarbyl group. For instance, each $R_{16}$ can be independently H, halogen, a $C_1$-$C_{15}$ alkyl (e.g., $C_1$-$C_{10}$ alkyl or $C_1$-$C_6$ alkyl), $C_1$-$C_{15}$ alkoxy (e.g., $C_1$-$C_{10}$ alkoxy or $C_1$-$C_6$ alkoxy), $C_6$-$C_{14}$ aryl (e.g., phenyl), $C_3$-$C_{15}$ cycloalkyl, $C_7$-$C_{15}$ arylalkyl (e.g., $C_7$-$C_{12}$ aralkyl), or $C_7$-$C_{15}$ alkylaryl (e.g., $C_7$-$C_{12}$ alkylaryl). Exemplary $R_{16}$ groups are H, halogen such as chloro or fluoro, a $C_1$-$C_6$ alkyl, $C_1$-$C_6$ alkoxy, phenyl, $C_7$-$C_{12}$ aralkyl, or $C_7$-$C_{12}$ alkylaryl. Each m' is independently an integer from 0 to 5, for instance, from 0 to 3. Exemplary $R_6$ and $R_7$ groups are $C_1$-$C_6$ alkyl, phenyl, $C_5$-$C_6$ cycloalkyl, $C_7$-$C_{12}$ arylalkyl, or $C_7$-$C_{12}$ alkylaryl. Exemplary $R_8$ groups are hydrogen; $C_1$-$C_6$ alkyl; $C_2$ to $C_8$ alkenyl; phenyl, naphthyl, or halophenyl; $C_5$-$C_6$ cycloalkyl; $C_7$-$C_{12}$ arylalkyl; or $C_7$-$C_{12}$ alkylaryl.

Exemplary diester compounds for formula IIb are 2,4-pentanediol dibenzoate, 3-methyl-2,4-pentanediol dibenzoate, 3-ethyl-2,4-pentanediol dibenzoate, 3-n-propyl-2,4-pentanediol dibenzoate, 3-i-propyl-2,4-pentanediol dibenzoate, 3-n-butyl-2,4-pentanediol dibenzoate, 3-i-butyl-2,4-pentanediol dibenzoate, 3-t-butyl-2,4-pentanediol dibenzoate, 3-n-pentyl-2,4-pentanediol dibenzoate, 3-i-pentyl-2,4-pentanediol dibenzoate, 3-cyclopentyl-2,4-pentanediol dibenzoate, 3-cyclohexyl-2,4-pentanediol dibenzoate, 3-phenyl-2,4-pentanediol dibenzoate, 3-(2-naphtyl)-2,4-pentanediol dibenzoate, 3-allyl-2,4-pentanediol dibenzoate, 3,3-dimethyl-2,4-pentanediol dibenzoate, 3-ethyl-3-methyl-2,4-pentanediol dibenzoate, 3-methyl-3-i-propyl-2,4-pentanediol dibenzoate, 3,3-diisopropyl-2,4-pentanediol dibenzoate, 3-i-pentyl-2-i-propyl-2,4-pentanediol dibenzoate, 3,5-heptanediol dibenzoate, 4,6-nonanediol dibenzoate, 2,6-dimethyl-3,5-heptanediol dibenzoate, 5,7-undecanediol dibenzoate, 2,8-dimethyl-4,6-nonanediol dibenzoate, 2,2,6,6,tetramethyl-3,5-hetanediol dibenzoate, 6,8-tridecanediol dibenzoate, 2,10-dimethyl-5,7-undecanediol dibenzoate, 1,3-dicyclopentyl-1,3-propanediol dibenzoate, 1,3-dicyclohexyl-1,3-propanediol dibenzoate, 1,3-diphenyl-1,3-propanediol dibenzoate, 1,3-bis(2-naphtyl)-1,3-propanediol dibenzoate, 2,4-hexanediol dibenzoate, 2,4-heptanediol dibenzoate, 2-methyl-3,5-hexanediol dibenzoate, 2,4-octanediol dibenzoate, 2-methyl-4,6-heptanediol dibenzoate, 2,2-dimethyl-3,5-hexanediol dibenzoate, 2-methyl-5,7-octanediol dibenzoate, 2,4-nonanediol dibenzoate, 1-cyclopentyl-1,3-butanediol dibenzoate, 1-cyclohexyl-1,3-butanediol dibenzoate, 1-phenyl-1,3-butanediol dibenzoate, 1-(2-naphtyl)-1,3-butanediol dibenzoate, 2,4-pentanediol-bis(4-methylbenzoate), 2,4-pentanediol-bis(3-methylbenzoate), 2,4-pentanediol-bis(4-ethylbenzoate), 2,4-pentanediol-bis(4-n-propylbenzoate), 2,4-pentanediol-bis(4-n-butylbenzoate), 2,4-pentanediol-bis(4-i-propylbenzoate), 2,4-pentanediol-bis(4-i-butylbenzoate), 2,4-pentanediol-bis(4-t-butylbenzoate), 2,4-pentanediol-bis(4-phenylbenzoate), 2,4-pentanediol-bis(3,4-dimethylbenzoate), 2,4-pentanediol-bis(2,4,6-trimethylbenzoate), 2,4-pentanediol-bis(2,6-dimethylbenzoate), 2,4-pentanediol-di-(2-naphthoate), 3-methyl-2,4-pentanediol-bis(4-n-propylbenzoate), 3-i-pentyl-2,4-pentanediol-bis(4-n-propylbenzoate), 1,1,1,5,5,5-hexafluoro-2,4-pentanediol-bis(4-ethylbenzoate), 1,1,1-trifluoro-2,4-pentanediol-bis(4-ethylbenzoate), 1,3-bis(4-chlorophenyl)-1,3-propanediol-bis(4-ethylbenzoate), pentafluorophenyl)-1,3-butanediol-bis(4-ethylbenzoate), 1,1-difluoro-4-phenyl-2,4-butandiol-bis(4-n-propylbenzoate), 1,1,1-trifluoro-5,5-dimethyl-2,4-hexandiol-bis(4-n-propylbenzoate), 1,1,1-trifluoro-4-(2-furyl)-2,4-butandiol-bis(4-n-propylbenzoate), 1,1,1-trifluoro-4-phenyl-2,4-butandiol-bis(4-n-propylbenzoate), 1,1,1-trifluoro-4-(2-thienyl)-2,4-butandiol-bis(4-n-propylbenzoate), 1,1,1-trifluoro-4-(4-chloro-phenyl)-2,4-butandiol-bis(4-n-propylbenzoate), 1,1,1-trifluoro-4-(2-naphtyl)-2,4-butandiol-bis(4-n-propylbenzoate), and 3-chloro-2,4-pentandiol-bis(4-n-propylbenzoate).

In some embodiments, m is 0, and $R_6$ and $R_7$ can form one or more saturated or unsaturated mono- or poly-cyclic structures. For instance, $R_6$ and $R_7$ can form an aryl group having the formula of:

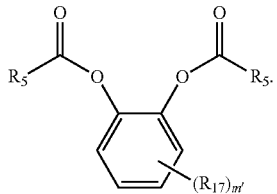

(IIc)

$R_5$ is defined as above. In certain embodiments, both $R_5$ groups are an aryl. For instance, the diester compound can have a formula of:

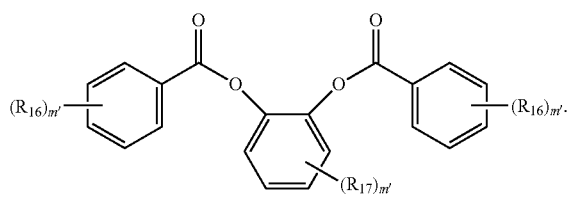

(IId)

Each of $R_{16}$ and $R_{17}$ is independently H, halogen, or a $C_1$ to $C_{18}$ hydrocarbyl group which can optionally form one or more saturated or unsaturated cyclic structures with the phenyl group it attaches to. Each of $R_{16}$ and $R_{17}$ can contain one or more heteroatoms, selected from the group consisting of halogens, P, N, O, S, and Si, that replace one or more carbon atoms in the hydrocarbyl group. For instance, each of $R_{16}$ and $R_{17}$ can be independently H, halogen (e.g., chloro or fluoro), or a $C_1$-$C_{15}$ alkyl (e.g., $C_1$-$C_{10}$ alkyl or $C_1$-$C_6$ alkyl), $C_1$-$C_{15}$ alkoxy (e.g., $C_1$-$C_{10}$ alkoxy or $C_1$-$C_6$ alkoxy), $C_6$-$C_{14}$ aryl (e.g., phenyl), $C_3$-$C_{15}$ cycloalkyl, $C_7$-$C_{15}$ arylalkyl (e.g., $C_7$-$C_{12}$ aralkyl), or $C_7$-$C_{15}$ alkylaryl (e.g., $C_7$-$C_{12}$ alkylaryl). Exemplary $R_{16}$ and $R_{17}$ groups are H, halogen such as chloro or fluoro, a $C_1$-$C_6$ alkyl, $C_1$-$C_6$ alkoxy, phenyl, $C_7$-$C_{12}$ aralkyl, or $C_7$-$C_{12}$ alkylaryl. Each m' is independently an integer from 0 to 5, for instance, from 0 to 3. Exemplary compounds for formula IId include those containing one or two $R_{17}$ groups and one $R_{16}$ on each benzoate moiety. For instance, exemplary compounds for formula IId can contain two $R_{17}$ groups, one at para-position and one at ortho-position to the —O—C(O)— group; and can contain one $R_{16}$ on each benzoate moiety, each at para-position to the —C(O)—O— group. A typical compound for formula IId is 5-(tert-butyl)-3-methly-1,2-phenylene dibenzoate.

In some embodiments, m is 1, $R_8$ is absent, and $R_6$ and $R_7$ can form a fused ring structure. For instance, $R_6$ and $R_7$ can form a naphthalene group, forming a 1,8-naphthalene diester compound having the formula of:

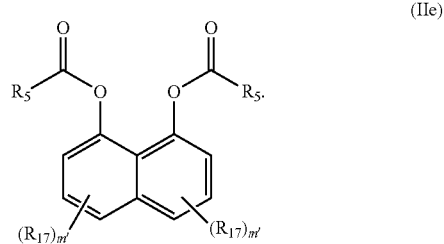

(IIe)

$R_5$ is defined as above. Each $R_{17}$ is independently H, halogen, or a $C_1$ to $C_{18}$ hydrocarbyl group which can optionally form one or more saturated or unsaturated cyclic structures with the phenyl group it attaches to. Each $R_{17}$ can contain one or more heteroatoms, selected from the group consisting of halogens, P, N, O, S, and Si, that replace one or more carbon atoms in the hydrocarbyl group. For instance, each $R_{17}$ can be independently H, halogen (e.g., chloro or fluoro), or a $C_1$-$C_{15}$ alkyl (e.g., $C_1$-$C_{10}$ alkyl or $C_1$-$C_6$ alkyl), $C_1$-$C_{15}$ alkoxy (e.g., $C_1$-$C_{10}$ alkoxy or $C_1$-$C_6$ alkoxy), $C_6$-$C_{14}$ aryl (e.g., phenyl), $C_3$-$C_{15}$ cycloalkyl, $C_7$-$C_{15}$ arylalkyl (e.g., $C_7$-$C_{12}$ aralkyl), or $C_7$-$C_{15}$ alkylaryl (e.g., $C_7$-$C_{12}$ alkylaryl). Exemplary $R_{17}$ groups are H, halogen such as chloro or fluoro, a $C_1$-$C_6$ alkyl, $C_1$-$C_6$ alkoxy, phenyl, $C_7$-$C_{12}$ aralkyl, or $C_7$-$C_{12}$ alkylaryl. Each m' is independently an integer from 0 to 5, for instance, from 0 to 3.

In formula IIe, exemplary $R_5$ groups are $C_1$-$C_{10}$ alkyl; $C_2$-$C_{10}$ alkenyl; $C_5$-$C_6$ cycloalkyl; $C_5$-$C_6$ cycloalkenyl; aryl such as phenyl; or heteroaryl, e.g., 5- or 6-membered ring heteroaryl, containing one or more heteroatoms N, O, or S, such as furanyl; each of these groups can be further substituted by one or more halogen atoms such as chloro or fluoro, $C_1$-$C_{10}$ alkyl, or $C_1$-$C_{10}$ alkyoxy. $R_5$ may be the same or different.

In certain embodiments, both $R_5$ groups are an aryl. For instance, the 1,8-napthalene diester compound can have a formula of:

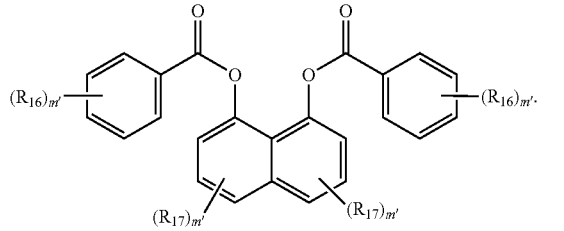

(IIf)

The definition of $R_{16}$ is the same as the definition of $R_{17}$, which is defined above. The integer m' is defined as above. Exemplary 1,8-napthalene diester compounds for formula IIf are 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8- naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; and 1,8-naphthyl di-3,5-di-t-butylbenzoate. A typical diester compound for formula IIf is 1,8-naphthyl dibenzoate.

Additional exemplary 1,8-napthalene diester compounds for formula II are

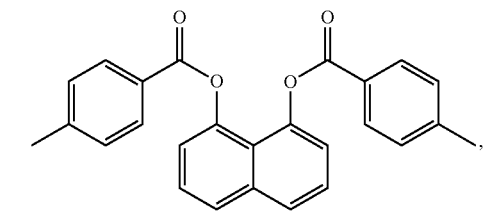

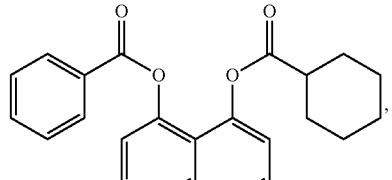

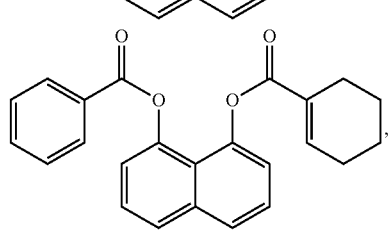

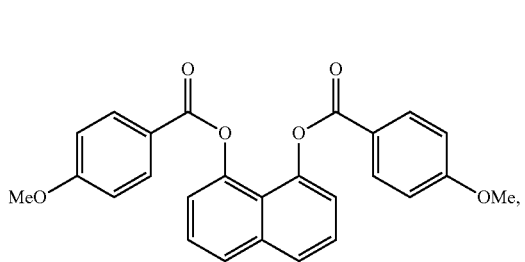

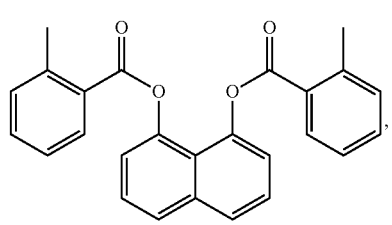

-continued

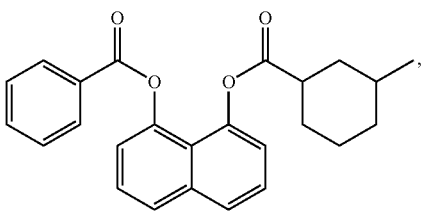

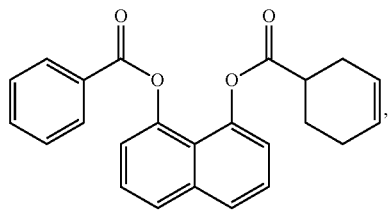

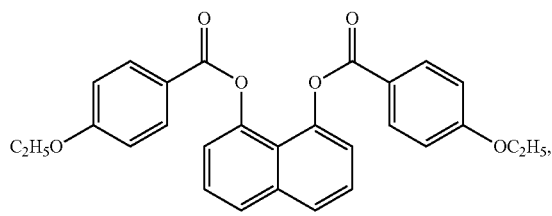

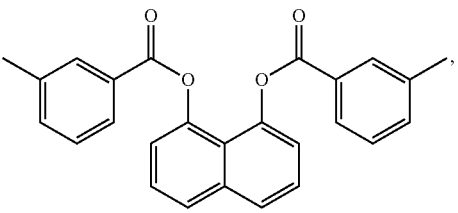

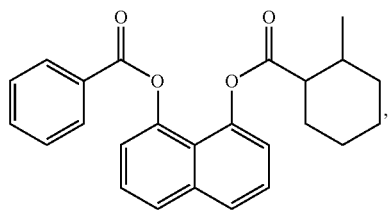

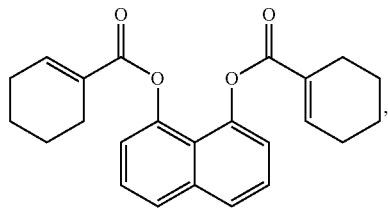

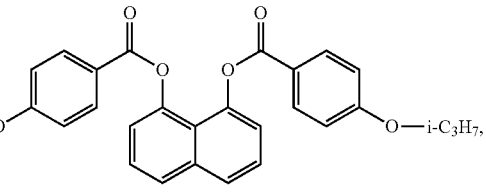

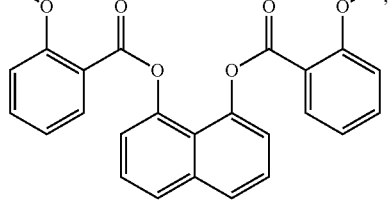

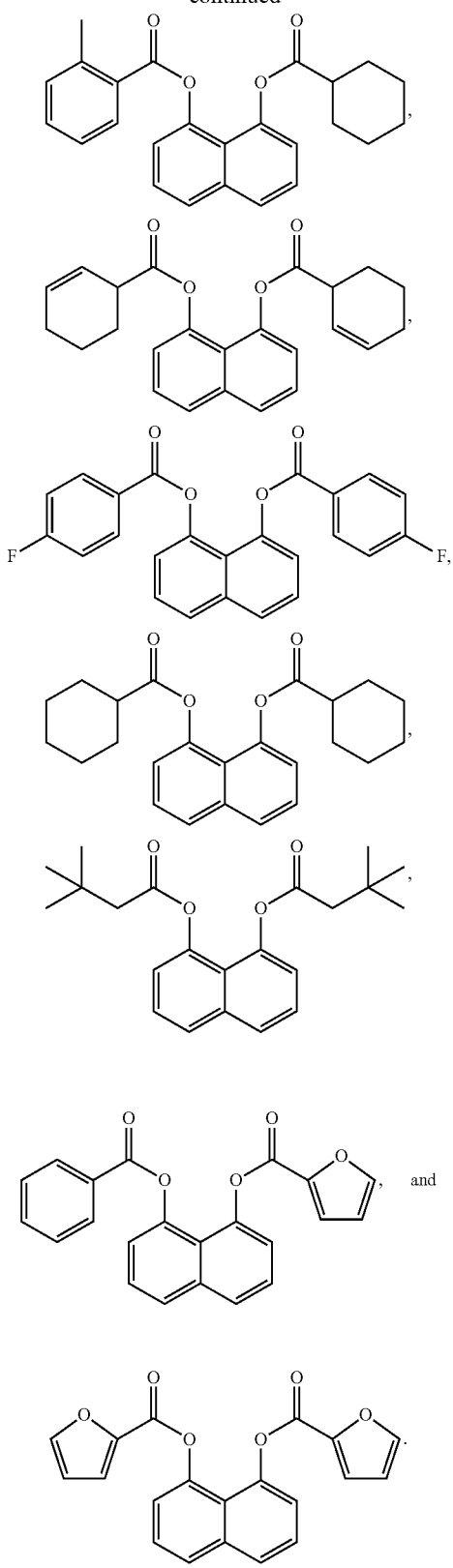

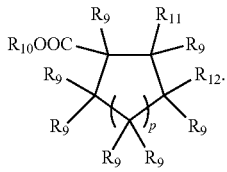
(III)

Each $R_9$ is independently H, halogen, or a $C_1$ to $C_{18}$ hydrocarbyl group. $R_9$ can contain one or more heteroatoms, selected from the group consisting of halogens, P, N, O, S, and Si, that replace one or more carbon atoms in the hydrocarbyl group. For instance, $R_9$ can be $C_1$ to $C_{18}$ alkyl such as $C_1$ to $C_8$ alkyl; $C_2$ to $C_{18}$ alkenyl such as $C_2$ to $C_8$ alkenyl; $C_3$ to $C_{18}$ cycloalkyl such as $C_5$ to $C_6$ cycloalkyl; aryl such as phenyl; $C_1$ to $C_{18}$ alkoxy such as $C_1$ to $C_8$ alkoxy; siloxy; aldehyde; or acetyl. Exemplary $R_9$ groups are methyl, ethyl, n-propyl, isopropyl, n-butyl, isobutyl, sec-butyl, n-pentyl, cyclopentyl, n-hexyl, cyclohexyl, octyl, vinyl, or phenyl. Typically, $R_9$ is methyl, ethyl, n-propyl, isopropyl, n-butyl, isobutyl, or sec-butyl. Two or more $R_9$ groups may also be bonded to each other to form a saturated or unsaturated mono- or poly-cyclic structure backbone, e.g., a fused ring and/or bridged polycyclic backbone. Exemplary fused ring and/or bridged polycyclic backbone are norbornane

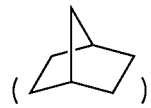

and tetracyclododecene

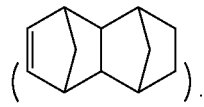

Each $R_{10}$ is independently a $C_1$ to $C_{20}$ hydrocarbyl group. For example, $R_{10}$ can be a $C_1$ to $C_{20}$ alkyl, $C_1$ to $C_{10}$ alkyl, $C_2$ to $C_8$ alkyl, or $C_4$ to $C_8$ alkyl. Exemplary $R_{10}$ groups are ethyl, n-propyl, isopropyl, n-butyl, isobutyl, hexyl, heptyl, octyl, 2-ethylhexyl, decyl, dodecyl, tetradecyl, hexadecyl, octadecyl, or eicosyl. Typically, $R_{10}$ is n-butyl or isobutyl.

Each $R_{11}$ and $R_{12}$ is independently $R_9$ or $-COOR_{10}$, provided that at least one of $R_{11}$ and $R_{12}$ is $-COOR_{10}$.

The integer p ranges from 1 to 6. For instance p can be 1, 2, 3. Typically, p is 2.

In some embodiments, the cyclic diester compound has a formula of

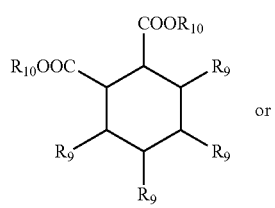
(IIIa)
or iii) Cyclic Diester Compound

The internal electron donor can be a cyclic diester compound having a formula of

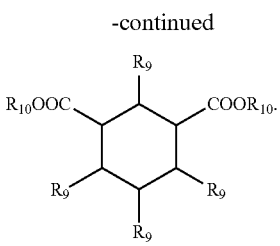

(IIIb)

In formulas IIIa and IIIb, each $R_{10}$ is independently a $C_1$ to $C_{10}$ alkyl, and each $R_9$ is independently H or a $C_1$ to $C_8$ alkyl, $C_3$ to $C_6$ cycloalkyl, $C_2$ to $C_6$ alkenyl, or phenyl. Exemplary cyclic diester compounds for formulas IIIa and IIIb are diisobutyl cyclohexane-1,2-dicarboxylate, diethyl 3-methylcyclohexane-1,2-dicarboxylate, di-n-propyl 3-methylcyclohexane-1,2-dicarboxylate, diisopropyl 3-methylcyclohexane-1,2-dicarboxylate, di-n-butyl 3-methylcyclohexane-1,2-dicarboxylate, diisobutyl 3-methylcyclohexane-1,2-dicarboxylate, dihexyl 3-methylcyclohexane-1,2-dicarboxylate, diheptyl 3-methylcyclohexane-1,2-dicarboxylate, dioctyl 3-methylcyclohexane-1,2-dicarboxylate, di-2-ethylhexyl 3-methylcyclohexane-1,2-dicarboxylate, didecyl 3-methylcyclohexane-1,2-dicarboxylate, diethyl 4-methylcyclohexane-1,3-dicarboxylate, diisobutyl 4-methylcyclohexane-1,3-dicarboxylate, diethyl 4-methylcyclohexane-1,2-dicarboxylate, di-n-propyl 4-methylcyclohexane-1,2-dicarboxylate, diisopropyl 4-methylcyclohexane-1,2-dicarboxylate, di-n-butyl 4-methylcyclohexane-1,2-dicarboxylate, diisobutyl 4-methylcyclohexane-1,2-dicarboxylate, dihexyl 4-methylcyclohexane-1,2-dicarboxylate, diheptyl 4-methylcyclohexane-1,2-dicarboxylate, dioctyl 4-methylcyclohexane-1,2-dicarboxylate, di-2-ethylhexyl 4-methylcyclohexane-1,2-dicarboxylate, didecyl 4-methylcyclohexane-1,2-dicarboxylate, diethyl 5-methylcyclohexane-1,3-dicarboxylate, diisobutyl 5-methylcyclohexane-1,3-dicarboxylate, diethyl 3,4-dimethylcyclohexane-1,2-dicarboxylate, di-n-propyl 3,4-dimethylcyclohexane-1,2-dicarboxylate, diisopropyl 3,4-dimethylcyclohexane-1,2-dicarboxylate, di-n-butyl 3,4-dimethylcyclohexane-1,2-dicarboxylate, diisobutyl 3,4-dimethylcyclohexane-1,2-dicarboxylate, dihexyl 3,4-dimethylcyclohexane-1,2-dicarboxylate, diheptyl 3,4-dimethylcyclohexane-1,2-dicarboxylate, dioctyl 3,4-dimethylcyclohexane-1,2-dicarboxylate, di-2-ethylhexyl 3,4-dimethylcyclohexane-1,2-dicarboxylate, didecyl 3,4-dimethylcyclohexane-1,2-dicarboxylate, diethyl 3,6-dimethylcyclohexane-1,2-dicarboxylate, di-n-propyl 3,6-dimethylcyclohexane-1,2-dicarboxylate, diisopropyl 3,6-dimethylcyclohexane-1,2-dicarboxylate, di-n-butyl 3,6-dimethylcyclohexane-1,2-dicarboxylate, diisobutyl 3,6-dimethylcyclohexane-1,2-dicarboxylate, dihexyl 3,6-dimethylcyclohexane-1,2-dicarboxylate, diheptyl 3,6-dimethylcyclohexane-1,2-dicarboxylate, dioctyl 3,6-dimethylcyclohexane-1,2-dicarboxylate, di-2-ethylhexyl 3,6-dimethylcyclohexane-1,2-dicarboxylate, didecyl 3,6-dimethylcyclohexane-1,2-dicarboxylate, diethyl 3,6-diphenylcyclohexane-1,2-dicarboxylate, di-n-propyl 3,6-diphenylcyclohexane-1,2-dicarboxylate, diisopropyl 3,6-diphenylcyclohexane-1,2-dicarboxylate, di-n-butyl 3,6-diphenylcyclohexane-1,2-dicarboxylate, diisobutyl 3,6-diphenylcyclohexane-1,2-dicarboxylate, dihexyl 3,6-diphenylcyclohexane-1,2-dicarboxylate, dioctyl 3,6-diphenylcyclohexane-1,2-dicarboxylate, didecyl 3,6-diphenylcyclohexane-1,2-dicarboxylate, diethyl 3-methyl-6-ethylcyclohexane-1,2-dicarboxylate, di-n-propyl 3-methyl-6-ethylcyclohexane-1,2-dicarboxylate, diisopropyl 3-methyl-6-ethylcyclohexane-1,2-dicarboxylate, di-n-butyl 3-methyl-6-ethylcyclohexane-1,2-dicarboxylate, diisobutyl 3-methyl-6-ethylcyclohexane-1,2-dicarboxylate, dihexyl 3-methyl-6-ethylcyclohexane-1,2-dicarboxylate, diheptyl 3-methyl-6-ethylcyclohexane-1,2-dicarboxylate, dioctyl 3-methyl-6-ethylcyclohexane-1,2-dicarboxylate, di-2-ethylhexyl 3-methyl-6-ethylcyclohexane-1,2-dicarboxylate, didecyl 3-methyl-6-ethylcyclohexane-1,2-dicarboxylate, diethyl 3-methyl-6-ethylcyclohexane-1,2-dicarboxylate, di-n-propyl 3-methyl-6-ethylcyclohexane-1,2-dicarboxylate, diisopropyl 3-methyl-6-ethylcyclohexane-1,2-dicarboxylate, di-n-butyl 3-methyl-6-ethylcyclohexane-1,2-dicarboxylate, diisobutyl 3-methyl-6-ethylcyclohexane-1,2-dicarboxylate, dihexyl 3-methyl-6-ethylcyclohexane-1,2-dicarboxylate, diheptyl 3-methyl-6-ethylcyclohexane-1,2-dicarboxylate, dioctyl 3-methyl-6-ethylcyclohexane-1,2-dicarboxylate, di-2-ethylhexyl 3-methyl-6-ethylcyclohexane-1,2-dicarboxylate, didecyl 3-methyl-6-ethylcyclohexane-1,2-dicarboxylate, diethyl 3-methyl-6-n-propylcyclohexane-1,2-dicarboxylate, di-n-propyl 3-methyl-6-n-propylcyclohexane-1,2-dicarboxylate, diisopropyl 3-methyl-6-n-propylcyclohexane-1,2-dicarboxylate, di-n-butyl 3-methyl-6-n-propylcyclohexane-1,2-dicarboxylate, diisobutyl 3-methyl-6-n-propylcyclohexane-1,2-dicarboxylate, dihexyl 3-methyl-6-n-propylcyclohexane-1,2-dicarboxylate, diheptyl 3-methyl-6-n-propylcyclohexane-1,2-dicarboxylate, dioctyl 3-methyl-6-n-propylcyclohexane-1,2-dicarboxylate, di-2-ethylhexyl 3-methyl-6-n-propylcyclohexane-1,2-dicarboxylate, dodecyl 3-methyl-6-n-propylcyclohexane-1,2-dicarboxylate, diethyl 3-hexylcyclohexane-1,2-dicarboxylate, diisobutyl 3-hexylcyclohexane-1,2-dicarboxylate, diethyl 3,6-dihexylcyclohexane-1,2-dicarboxylate, and diisobutyl 3-hexyl-6-pentylcyclohexane-1,2-dicarboxylate. Typically, the cyclic diester compound is diisobutyl cyclohexane-1,2-dicarboxylate or diisobutyl 3,6-dimethylcyclohexane-1,2-dicarboxylate. Mixtures of two or more such cyclic diester compounds may be used as well.

iv) Succinate Compound

The internal electron donor can be a succinate compound having a formula of

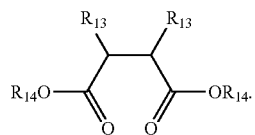

(IV)

Each of $R_{13}$ and $R_{14}$ is independently a $C_1$ to $C_{18}$ hydrocarbyl group. For instance, each of $R_{13}$ and $R_{14}$ can be $C_1$ to $C_{18}$ alkyl, $C_2$ to $C_{18}$ alkenyl, $C_3$ to $C_{18}$ cycloalkyl, or aryl. The alkyl, alkenyl, cycloalkyl, and aryl for each R group can be further substituted with one or more of alkyl, cycloalkyl, aryl, or halogen groups. Each of $R_{13}$ and $R_{14}$ can contain one or more heteroatoms, selected from the group consisting of halogens, P, N, O, S, and Si, that replace one or more carbon atoms in the hydrocarbyl group. Typically, $R_{13}$ is $C_1$ to $C_6$ alkyl, $C_5$-$C_6$ cycloalkyl, phenyl, fluorenyl; each of these groups can be optionally substituted with one or more of $C_1$ to $C_6$ alkyl, $C_5$-$C_6$ cycloalkyl, phenyl, or halogen atoms such as fluoro or chloro. Typically, $R_{14}$ is $C_1$ to $C_6$ alkyl.

Exemplary succinate compounds are diethyl 2-sec-butyl-3-methylsuccinate, diethyl 2-(3,3,3-trifluoropropyl)-3-methylsuccinate, diethyl 2,3-bis(2-ethylbutyl) succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis (cyclohexylmethyl) succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2-(9-fluorenyl)succinate, diethyl 2-isopropyl-3-isobutylsuccinate, diethyl 2-t-butyl-3-isopropylsuccinate, diethyl 2-isopropyl-1,3-cyclohexylsuccinates diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetra-n-propylsuccinate, diethyl 2,3-diethyl-2,3-diisopropylsuccinate, diisobutyl 2,3-bis(trimethylsilyl) succinate, diisobutyl 2-sec-butyl-3-methylsuccinate, diisobutyl 2-(3,3,3-trifluoropropyl)-3-methylsuccinate, diisobutyl 2,3-bis(2-ethylbutyl)succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl) succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-bis(3,3,3-trifluoropropyl)succinate, diisobutyl 2,3-di-n-propylsuccinate, diisobutyl 2-(9-fluorenyl)succinate, diisobutyl 2-isopropyl-3-isobutylsuccinate, diisobutyl 2-t-butyl-3-isopropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetra-n-propylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3 bis-(2-ethylbutyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis-(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-bis(3,3,3-trifluoropropyl)succinate, dineopentyl 2,3-n-propylsuccinate, dineopentyl 2-(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetra-ethylsuccinate, dineopentyl 2,2,3,3-tetra-n-propylsuccinate, dineopentyl 2,3-diethyl-2,3-diisopropylsuccinate, diethyl 1,2-cyclohexanedicarboxylate, and diethyl norbornene-2,3-dicarboxylate. Typically, the succinate compound is diethyl 2,3-diisopropylsuccinate. Mixtures of two or more such succinate compounds may be used as well.

Preparation of Solid Ziegler-Nata Catalyst Composition

The solid Ziegler-Nata procatalyst composition can be carried out by various methods known to one skilled in the art. For instance, the titanium compound, the magnesium dichloride in an anhydrous state, and the electron donor compounds can be milled together under conditions in which activation of the magnesium dichloride occurs. The product can be treated one or more times with an excess of $TiCl_4$ at a temperature about 80 to 135° C., followed by washings with hydrocarbon solvents until chloride ions disappear. Alternatively, magnesium dichloride is preactivated by methods known to one skilled in the art, and then treated with an excess of $TiCl_4$ at a temperature of about 80 to 135° C. in the presence of the electron donor compounds. The treatment with $TiCl_4$ can be repeated and the solid can be washed with a hydrocarbon solvent such as hexane to eliminate any non-reacted $TiCl_4$.

In another example, the titanium compound, the magnesium chloride in an anhydrous state, the electron donor compounds can be milled together under conditions in which activation of the magnesium chloride occurs. The product can be treated with halogenated hydrocarbons such as 1,2-dichloroethane, chlorobenzene, dichloromethane, etc., for about 1 and 4 hours and at temperature of from 40° C. to the boiling point of the halogenated hydrocarbon. The product is then washed with inert hydrocarbon solvents such as hexane.

In another example, the solid catalyst component can be prepared by reacting a titanium compound of formula $TiX_x$ or $Ti(OQ)_gX_{4-g}$ with a magnesium chloride deriving from an adduct of formula $(MgCl_2)_pROH$, in which p is a number between 0.1 and 6, for instance, between 2 to 3.5; and R is a $C_1$-$C_{18}$ hydrocarbyl. The adduct can be suitably prepared in spherical form by mixing alcohol and magnesium chloride in the presence of an inert hydrocarbon immiscible with the adduct, operating under stirring conditions at the melting temperature of the adduct (100-130° C.). The emulsion can then be quenched, causing the solidification of the adduct in form of spherical particles. Examples of spherical adducts prepared according to this procedure are described in U.S. Pat. Nos. 4,399,054 and 4,469,648, which are incorporated herein by reference in their entirety. The obtained adduct can be directly reacted with the titanium compound. Alternatively, the obtained adduct can be first subjected to thermally controlled dealcoholation (at 80-130° C.) to obtain an adduct in which the number of moles of alcohol is generally lower than 3, for instance, between 0.1 and 2.5. The reaction of the adduct with the titanium compound can be carried out by suspending the adduct (dealcoholated or not) in cold $TiCl_4$ (generally at 0° C.), and heating the mixture to about 80-130° C. (the temperature can be kept at this range for about 0.5-2 hours). The treatment with $TiCl_4$ can be carried out one or more times. The electron donor compounds can be added during the treatment with $TiCl_4$, and can be added together in the same treatment with $TiCl_4$ or separately in two or more treatments.

The preparations of the solid catalyst components in spherical forms are described, for example, in WO98/44001 and U.S. Patent Application Publication No. 2013/0197173, which are incorporated herein by reference in their entirety.

The solid Ziegler-Nata procatalyst composition can contain from about 0.5 to about 6.0 wt % titanium; from about 10 to about 25 wt % magnesium; from about 40 to about 70 wt % halogen; from about 1 to about 50 wt % internal electron donor compound; and optionally inert diluent from about 0 to about 15 wt %. For instance, the Ziegler-Nata procatalyst composition contains from about 2 to about 20 wt % of one or more of the internal electron donor compounds, or from about 5 to about 15 wt % of one or more of the internal electron donor compounds.

The amounts of the components used in preparing the solid Ziegler-Nata procatalyst composition may vary depending upon the method of preparation. For instance, from about 0.01 to about 5 moles of the total internal electron donor compounds and from about 0.01 to about 500 moles of the titanium compound are used per mole of the magnesium compound used to make the solid procatalyst composition. Typically, from about 0.05 to about 2 moles of the total internal electron donor compounds and from about 0.05 to about 300 moles of the titanium compound are used per mole of the magnesium compound used to make the solid procatalyst composition.

The Ziegler-Natta procatalyst composition may also include an inert support material. The support material may be an inert solid which does not adversely alter the catalytic performance of the transition metal compound. Exemplary inert support materials include metal oxides, such as alumina, and metalloid oxides, such as silica.

Cocatalyst

The non-phthalate catalyst system may further comprise an organometallic cocatalyst. The metal element in the organometallic cocatalyst is a Group 13 metal, for instance, aluminum. Suitable organoaluminum compounds include those having at least one aluminum-carbon bond in the molecule, such as alkylaluminum, alkylaluminum hydride, alkylaluminum halide, and alkylaluminum alkoxide containing from 1-10 or 1-6 carbon atoms in each alkyl or alkoxide group. Exemplary organoaluminum compounds are trialkyl aluminums, such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride, and ethyl aluminum sesquibromide; partially halogenated alkyl aluminums, e.g., alkyl aluminum dihalides such as ethyl aluminum dichloride, propyl aluminum dichloride, and butyl aluminum dibromide; dialkyl aluminum hydrides such as diethyl aluminum hydride and dibutyl aluminum hydride; other partially hydrogenated alkyl aluminum, e.g., alkyl aluminum dihyrides such as ethyl aluminum dihydride and propyl aluminum dihydride; and partially alkoxylated and halogenated alkyl aluminums, such as ethyl aluminum ethoxychloride, butyl aluminum butoxychloride, and ethyl aluminum ethoxybromide.

The organometallic cocatalyst used in the non-phthalate catalyst system is in an amount that the molar ratio of the metal in the organometallic cocatalyst to transition metal in the Ziegler-Natta procatalyst composition is from about 5 to about 1000, for instance, from about 10 to about 700, from about 25 to about 400, or from about 100 to about 300.

External Donor

The non-phthalate catalyst system also includes one or more non-silane external electron donor compounds. The external electron donor is a compound added independent of the Ziegler-Natta procatalyst formation, and contains at least one functional group that is capable of donating a pair of electrons to a metal atom. The external electron donor compound serves as one component of the non-phthalate Ziegler-Natta catalyst system for olefin polymerization, often contributing to the ability to obtain a polymer having a controllable molecular weight distribution and controllable crystallinity. In fact, when an external donor compound is absent, the isotactic index of the resulting polymer is not sufficiently high even if the internal donor is used. Also, for the non-phthalate catalyst system, the conventional alkoxysilane external donors often times do not have significant modifying effect on the performance of the non-phthalate catalyst system. The non-silane external donors below are chemically different from alkoxysilanes and provide improvements in the performance of the non-phthalate catalyst system.

The external donor compound is used in the non-phthalate catalyst system in an amount that the molar ratio of the total external donor compounds to the transition metal in the Ziegler-Natta procatalyst composition (e.g., titanium compound) ranges from about 0.5 to about 90, for instance, from about 1 to about 70, or from about 1 to about 30.

i) Triester Compound

The external electron donor can be a triester compound having a formula of

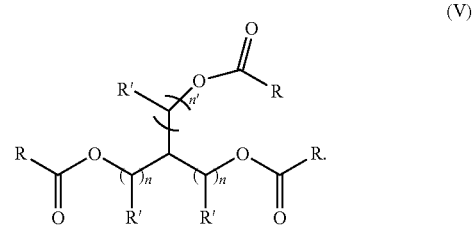

(V)

Each R is independently a $C_1$-$C_{10}$ hydrocarbyl group. For instance, each R is a $C_1$ to $C_{10}$ alkyl, such as methyl, ethyl, or isobutyl; optionally substituted with methyl, isobutyl, or 2-ethylhexyl. Each R' is independently H or R. Each n is independently an integer from 1 to 4, for instance, from 1 to 2, or 1. The integer n' ranges from 0 to 4, for instance, from 0 to 2 or 0. A typical triester compound is glyceryl triacetate (

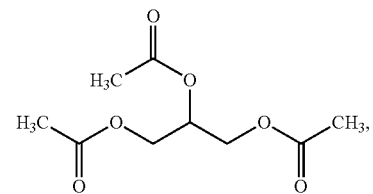

also referred to as triacetin), in which R is methyl, R' is H, n is 1, and n' is 0.

ii) Diester Compound

The external electron donor can be a diester compound having a formula of

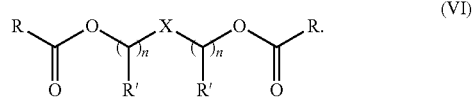

(VI)

X is $CH_2$ or O. Each R is independently a $C_1$-$C_{10}$ hydrocarbyl group. For instance, each R is a $C_1$ to $C_{10}$ alkyl, such as methyl, ethyl, or isobutyl; optionally substituted with methyl, isobutyl, or 2-ethylhexyl. Each R' is independently H or R. Each n is independently an integer from 1 to 4, for instance, from 1 to 2. Typical diester compounds include those having R as methyl, R' as H, and n as 2. For instance, two typical diester compounds are 1,5-pentanediol diacetate

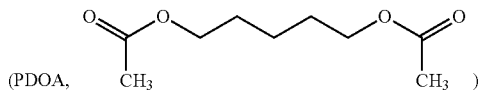

(PDOA, )

and diethyleneglycol diacetate

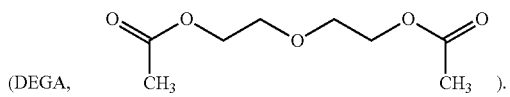

(DEGA, ).

iii) Oxo-Substituted Diester Compound

The external electron donor can be an oxo-substituted triester compound having a formula of

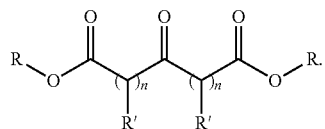

(VII)

Each R is independently a $C_1$-$C_{10}$ hydrocarbyl group. For instance, each R is a $C_1$ to $C_{10}$ alkyl, such as methyl, ethyl, or isobutyl; optionally substituted with methyl, isobutyl, or 2-ethylhexyl. Each R' is independently H or R. Each n is independently an integer from 1 to 4, for instance, from 1 to 2. A typical oxo-substituted triester compound is diethyl-4-oxopimelate

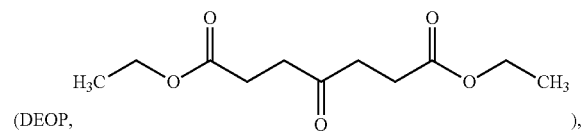 [SMILES: CCOC(=O)CCC(=O)CCC(=O)OCC]

(DEOP, ), in which each R is methyl, each R' is H, and each n is 2.

A second aspect of the invention relates to a non-phthalate catalyst system for olefin polymerization. The non-phthalate catalyst system comprises (a) a solid Ziegler-Natta catalyst composition comprising a transition metal, a Group 2 metal, and one or more halogens; and one or more internal electron donor compounds; and (b) one or more external electron donor compounds.

The internal electron donor compound is i) a diester compound having a formula of

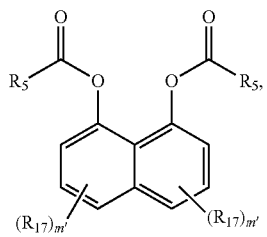

(IIe)

or ii) a cyclic diester compound having a formula of

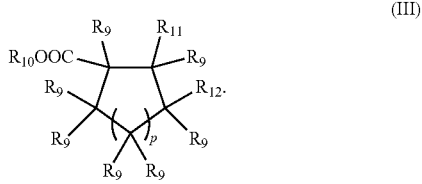

(III)

In these formulas, each $R_5$ is independently a $C_1$ to $C_{18}$ hydrocarbyl group which can optionally form one or more saturated or unsaturated mono- or poly-cyclic structures. Each $R_{17}$ is independently H, halogen, or $C_1$ to $C_{18}$ hydrocarbyl group which can optionally form one or more saturated or unsaturated cyclic structures with the phenyl group it is attached to. Each $R_9$ is independently H, halogen, or $C_1$ to $C_{18}$ hydrocarbyl group. Each $R_{10}$ is independently $C_1$ to $C_{20}$ hydrocarbyl group. Each of $R_{11}$ and $R_{12}$ is independently $R_9$ or —$COOR_{10}$, provided that at least one of $R_{11}$ and $R_{12}$ is —$COOR_{10}$. Each m' is independently an integer from 0 to 5. The integer p ranges from 1 to 6. Each of $R_5$, $R_9$, and $R_{17}$ can contain one or more heteroatoms, selected from the group consisting of halogens, P, N, O, S, and Si, that replace one or more carbon atoms in the hydrocarbyl group.

In certain embodiments, the internal donor is a diester compound having a formula of

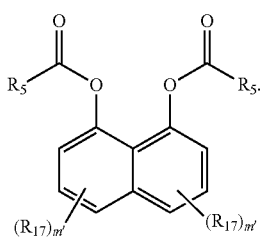

(IIe)

The definition of m', $R_5$, and $R_{17}$, and the exemplary embodiments for the m', $R_5$, and $R_{17}$ groups are the same as those described for formula IIe in the first aspect of the invention.

A typical diester compound has a formula of:

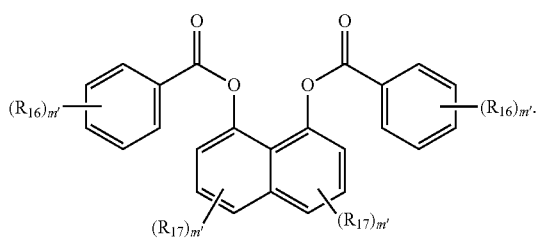

(IIf)

The definition of m', $R_{16}$, and $R_{17}$ and the exemplary embodiments for the m', $R_{16}$, and $R_{17}$ groups are the same as those described for formula IIf in the first aspect of the invention. The exemplary 1,8-napthalene diester compounds are the same as those exemplary 1,8-napthalene diester compounds described for formula IIf in the first aspect of the invention.

Additional exemplary 1,8-napthalene diester compounds described for formula IIe in the first aspect of the invention also can be used in this aspect of the invention as the internal electron donor.

In certain embodiments, the internal donor is a cyclic diester compound having a formula of

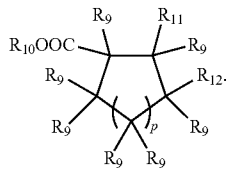
(III)

The definitions of p, $R_9$, $R_{10}$, $R_{11}$, and $R_{12}$ and the exemplary embodiments for the p, $R_9$, $R_{10}$, $R_{11}$, and $R_{12}$ groups are the same as those described for formula III in the first aspect of the invention.

A typical cyclic diester compound has a formula of

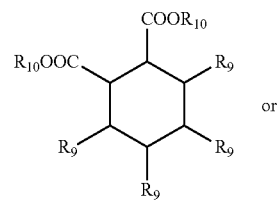
(IIIa)

or

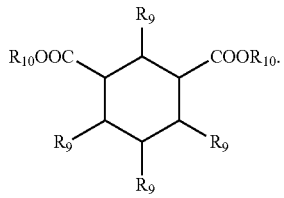
(IIIb)

The definitions of $R_9$ and $R_{10}$, and the exemplary embodiments for the $R_9$ and $R_{10}$ groups are the same as those described for formula IIIa and IIIb in the first aspect of the invention. The exemplary cyclic diester compounds are the same as those exemplary cyclic diester compounds described for formulas IIIa and IIIb in the first aspect of the invention.

The non-phthalate catalyst system also includes one or more external electron donor compounds having a formula of

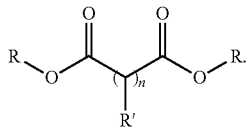
(VIII)

The external electron donor compound does not contain an alkoxysilane compound. In formula VIII, each R is independently a $C_1$ to $C_{10}$ hydrocarbyl group, and can contain one or more heteroatoms, selected from the group consisting of halogens, P, N, O, S, and Si, that replace one or more carbon atoms in the hydrocarbyl group. R' is H or R. For instance, each R is a $C_1$ to $C_{10}$ alkyl, such as methyl, ethyl, propyl, butyl, or hexyl; $C_3$-$C_8$ cycloalkyl, such as $C_5$-$C_6$ cycloalkyl; or $C_3$-$C_8$ heterocycloalkyl, such as $C_5$-$C_6$ heterocycloalkyl containing one or more heteroatoms N, O, or S (e.g., piperidinyl); each of these groups can be optionally substituted with one or more $C_1$ to $C_{10}$ alkyl, such as methyl, ethyl, isobutyl, or 2-ethylhexyl. The integer n ranges from 1 to 10, for instance, from 1 to 8.

Exemplary external electron donor compounds for formula VIII include those containing R as methyl, ethyl, propyl, butyl, hexyl, or piperidinyl; optionally substituted with one or more $C_1$-$C_6$ alkyl; R' as H; and n as 1 to 8. Typical external electron donor compounds for formula VIII are diethyl malonate, diethyl succinate, diethyl glutarate, diethyl adipate, diisopropyl adipate, dibutyl adipate, diisobutyl adipate, bis (2-ethylhexyl) adipate, diethyl pimelate, diethyl azelate, diethyl sebacate, and bis(2,2,6,6-tetramethyl-4-piperidyl) sebacate (e.g., Tinuvin® 770, (e.g., Tinuvin ® 770, 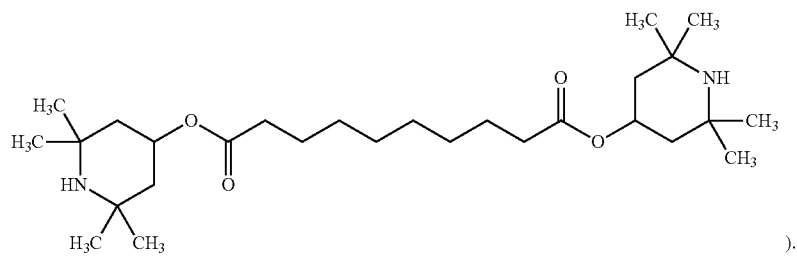 ).

In this aspect of the invention, the transition metal compound and Group 2 metal compounds in the Ziegler-Natta procatalyst, and the preparation of solid Ziegler-Natta procatalyst composition are the same as those described in the first aspect of the invention. The organometallic cocatalyst in the non-phthalate catalyst system is the same as those described in the first aspect of the invention.

Process of Polymerization

Another aspect of the invention relates to a process for preparing a polyolefin. The process comprises polymerizing one or more olefins, in the presence of the non-phthalate catalyst system under reaction conditions known by one skilled in the art sufficient to form the polyolefin. The non-phthalate catalyst system may be any non-phthalate catalyst system described herein according to the embodiments in the first and second aspects of the invention.

The reaction conditions are temperature and pressure ranges within a polymerization reactor suitable for promoting polymerization and/or copolymerization between one or more olefins and the non-phthalate catalyst system to form the desired polymer. The polymerization process may be performed in any manner including gas phase, slurry, or a bulk polymerization process, with the polymerization occurring in one or more reactor(s).

The olefins may be linear or branched olefins having 2 to 20 carbon atoms, 2 to 16 carbon atoms, or 2 to 12 carbon atoms. Typically, the olefin used to prepare the polyolefin is an $\alpha$-olefin. Exemplary linear or branched $\alpha$-olefins includes, but are not limited to, ethylene, propylene, 1-butene, 2-butene, 1-pentene, 3-methyl-1-butene, 4-methyl-1-pentene, 3-methyl-1-pentene, 1-hexene, 3,5,5-trimethyl-1-hexene, 4,6-dimethyl-1-heptene, 1-octene, 1-decene, 1-undecene, 1-dodecene, 1-tetradecene, 1-hexadecene, 1-octadecene, and 1-eicocene. For instance, the olefin used to prepare a polyolefin is propylene. These olefins may contain one or more heteroatoms such as an oxygen, nitrogen, or silicon. The olefin may be used individually or in mixture, either the gaseous state or the liquid state.

The polymerization process may include a pre-activation step. Pre-activation includes contacting the Ziegler-Natta procatalyst composition with the cocatalyst and the external electron donor compound. The resulting preactivated catalyst stream is subsequently introduced into the polymerization reaction zone and contacted with the olefin monomer to be polymerized. Optionally, one or more of the external electron donor components may be added at this time. Pre-activation results in the combination of the procatalyst composition with the cocatalyst and the external electron donor compounds.

Alternatively, the polymerization process may include a pre-polymerization step. Pre-polymerization includes contacting a small amount of the olefin with the Ziegler-Natta procatalyst composition after the procatalyst composition has been contacted with the cocatalyst and the external donor compound. Then, the resulting preactivated catalyst stream is introduced into the polymerization reaction zone and contacted with the remainder of the olefin monomer to be polymerized. Optionally, one or more of the external electron donor components may be added at this time. Pre-polymerization results in the procatalyst composition being combined with the cocatalyst and the external electron donor compounds, with the combination being dispersed in a matrix of the polymer during polymerization, to facilitate the polymerization.

Typically, a catalyst is considered to be pre-polymerized when the amount of the polymer produced is from about 0.1 to about 1000 gram per gram of the solid catalyst system. The pre-polymerization step can be carried out at temperatures from about 0° C. to about 80° C., for instance, from 5° C. to 50° C., in liquid or gas phase. The pre-polymerization step can be performed in-line as a part of a continuous polymerization process or separately in a batch process.

Any kind of polymerization process suitable for preparing a polyolefin can be used with the non-phthalate catalyst system. The polymerization can be carried out, for example, in bulk phase using a liquid monomer (e.g., propylene) as a reaction medium, in slurry using an inert liquid (e.g., hydrocarbon) as a diluent, in solution using either monomers or inert hydrocarbons as solvent for the nascent polymer, or in gas phase, operating in one or more fluidized or mechanically agitated bed reactors.

The polymerization process can be a gas phase polymerization process, operating in one or more reactors. A suitable gas phase polymerization process includes the use of condensing mode as well as super condensing mode wherein gaseous components (including addition of inert low boiling compounds) are injected into the reactor in liquid form. When multiple reactors are employed, it is desirable that they operate in series, e.g., the effluent from the first reactor is charged to the second reactor, with an additional monomer (for homopolymerization) or different monomer (for copolymerization) added to continue the polymerization. Additional amount of the same or different non-phthalate catalyst system or catalyst components (e.g., the procatalyst composition, cocatalyst, or external donor compound) may be added.

As an example, the polymerization process includes preparing an ethylene-propylene copolymer by contacting propylene and ethylene with the non-phthalate catalyst system. For instance, the polymerization process can be conducted in two reactors in which two olefins, such as propylene and ethylene, are contacted to prepare a copolymer. Polypropylene is prepared in the first reactor by a bulk phase (e.g., solution) homopolymerization, and a copolymer of ethylene and propylene is prepared in the second reactor in the presence of the polypropylene from the first reactor by a gas phase copolymerization. Alternatively, the polymerization process can be conducted in one reactors but in two sequential steps, with a bulk phase homopolymerization of polypropylene in the first step, and a a gas phase copolymerization of ethylene and propylene in the presence of the polypropylene in the second step. This process is exemplified in Example 2. Regardless of the polymerization technique employed, it is understood that the procatalyst composition, the cocatalyst, and the external electron donor thereof may be contacted in the absence of other polymerization components, especially monomer, prior to addition to the reactor.

The temperature of the polymerization process can range from about 20 to about 130° C., from about 60 to about 100° C., or from about 70° C. to about 85° C. For instance, when the polymerization is carried out in gas phase, the temperature of the polymerization process can range from about 75 to about 85° C., for instance at about 80° C.; when the polymerization is carried out in bulk phase, the temperature of the polymerization process can range from about 70 to about 80° C., for instance at about 75° C. When the polymerization is carried out in gas phase, the operating pressure generally ranges from about 0.5 to about 10 MPa, from about 0.9 to about 5 MPa, or from about 4 to about 5 MPa. In the bulk polymerization, the operating pressure generally ranges from about 0.5 to about 6 MPa, from about 0.9 to about 4 MPa, or from about 3.5 to about 4 MPa.

The resulting polymer prepared according to the above process, using the non-phthalate catalyst system described in this invention, has an improved isotacticity. Moreover, the resulting polymer prepared according to the process of the invention has an improved hydrogen response characterized by melt flow rate. Surprisingly, the polymer prepared by the non-phthalate catalyst system described in this invention, with the non-silane external donors, can have improved hydrogen response and isotacticity at the same time. This is surprising behavior because, in a typical Ziegler-Natta catalyst system, the external donors that increase hydrogen response (i.e., characterized by MFR) typically decrease isotacticity (i.e., characterized by increased % XS).

In some embodiments, the non-phthalate catalyst system used contains the internal electron donor compound that is a diether compound having a formula of

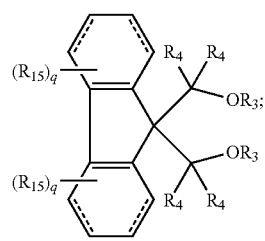

(Ib)

and the external electron donor compound that is a triester compound having a formula of

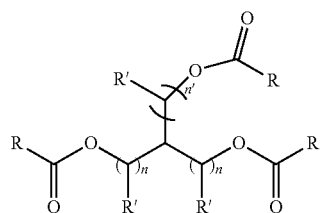

(V)

or a diester compound having a formula of

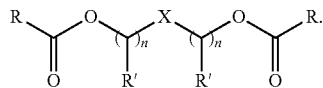

(VI)

The definitions of $R_3$, $R_4$, $R_{15}$, R, R', q, and n are the same as those described for formula Ib, V, and VI in the first aspect of the invention. The exemplary internal donor compounds and external donor compounds are the same as those exemplary compounds described for formulas Ib, V, and VI in the first aspect of the invention.

For instance, in a typical non-phthalate catalyst system, the internal electron donor compound is 9,9-bis(methoxymethyl)fluorene, and the external electron donor compound is triacetin, 1,5-pentanediol diacetate, diethyl-4-oxopimelate, or diethyleneglycol diacetate. For instance, one non-phthalate catalyst system uses 9,9-bis(methoxymethyl)fluorene as the internal electron donor compound and triacetin as the external electron donor compound; another non-phthalate catalyst system uses 9,9-bis(methoxymethyl)fluorene as the internal electron donor compound and diethyl-4-oxopimelate as the external electron donor compound. In these embodiments, the polymer prepared according to the process of the invention has an improved isotacticity. Moreover, the resulting polymer prepared according to the process of the invention has an improved hydrogen response characterized by melt flow rate. Surprisingly, the polymer prepared by the non-phthalate catalyst system described in this invention, with the non-silane external donors, can have improved hydrogen response and isotacticity at the same time. This is surprising behavior because, in a typical Ziegler-Nana catalyst system, the external donors that increase hydrogen response (i.e., characterized by MFR) mostly decrease isotacticity (i.e., characterized by increased % XS).

In some embodiments, the non-phthalate catalyst system used contains the internal electron donor compound that is a diester compound having a formula of

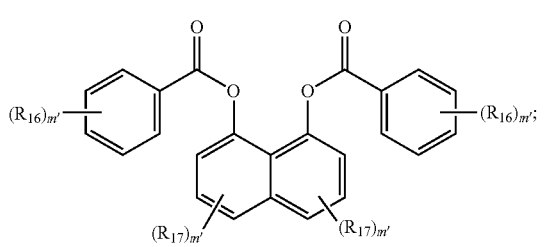

(IIf)

and one or more external electron donor compounds having a formula of

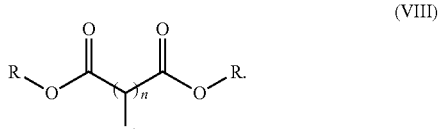

(VIII)

The definitions of $R_{16}$, $R_{17}$, R, R', m', and n are the same as those described for formula IIf and VIII in the first and second aspect of the invention. The exemplary internal donor compounds and external donor compounds are the same as those exemplary compounds described for formulas IIf and VIII in the first and second aspect of the invention.

For instance, in a typical non-phthalate catalyst system, the internal electron donor compound is 1,8-naphthyl dibenzoate, and the external electron donor compound is diethyl adipate, diethyl pimelate, diethyl sebacate, triacetin, Tinuvin 770® (bis(2,2,6,6-tetramethyl-4-piperidyl) sebacate), 1,5-pentanediol diacetate, diethyl-4-oxopimelate, or diethyl-eneglycol diacetate. For instance, one non-phthalate catalyst system uses 1,8-naphthyl dibenzoate as the internal electron donor compound and triacetin as the external electron donor compound; another non-phthalate catalyst system uses 1,8-naphthyl dibenzoate as the internal electron donor compound and diethyl-4-oxopimelate as the external electron donor compound. In these embodiments, the polymer prepared according to the process of the invention has an improved isotacticity. Moreover, the resulting polymer prepared according to the process of the invention has an improved hydrogen response characterized by melt flow rate.

Surprisingly, the polymer prepared by the non-phthalate catalyst system described in this invention, with the non-silane external donors, can have improved hydrogen response and isotacticity at the same time. This is surprising behavior because, in a typical Ziegler-Natta catalyst system, the external donors that increase hydrogen response (i.e., characterized by MFR) mostly decrease isotacticity (i.e., characterized by increased % XS).

In some embodiments, the non-phthalate catalyst system used contains the internal electron donor compound that is a cyclic diester compound having a formula of

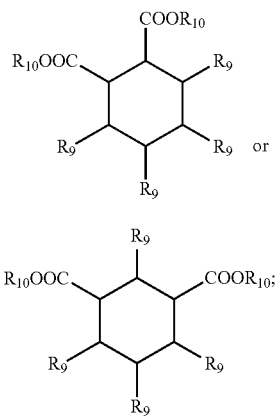

(IIIa)

(IIIb)

and one or more external electron donor compounds having a formula of

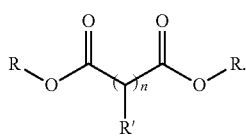

(VIII)

The definitions of $R_9$, $R_{10}$, R, R', and n are the same as those described for formula IIIa, IIIb, and VIII in the first and second aspect of the invention. The exemplary internal donor compounds and external donor compounds are the same as those exemplary compounds described for formulas IIIa, IIIb, and VIII in the first and second aspect of the invention.

For instance, in a typical non-phthalate catalyst system, the internal electron donor compound is selected from the group consisting of diisobutyl cyclohexane-1,2-dicarboxylate, diethyl 3-methylcyclohexane-1,2-dicarboxylate, di-n-propyl 3-methylcyclohexane-1,2-dicarboxylate, diisopropyl 3-methylcyclohexane-1,2-dicarboxylate, di-n-butyl 3-methylcyclohexane-1,2-dicarboxylate, diisobutyl 3-methylcyclohexane-1,2-dicarboxylate, dihexyl 3-methylcyclohexane-1,2-dicarboxylate, diheptyl 3-methylcyclohexane-1,2-dicarboxylate, dioctyl 3-methylcyclohexane-1,2-dicarboxylate, di-2-ethylhexyl 3-methylcyclohexane-1,2-dicarboxylate, didecyl 3-methylcyclohexane-1,2-dicarboxylate, diethyl 4-methylcyclohexane-1,3-dicarboxylate, diisobutyl 4-methylcyclohexane-1,3-dicarboxylate, diethyl 4-methylcyclohexane-1,2-dicarboxylate, di-n-propyl 4-methylcyclohexane-1,2-dicarboxylate, diisopropyl 4-methylcyclohexane-1,2-dicarboxylate, di-n-butyl 4-methylcyclohexane-1,2-dicarboxylate, diisobutyl 4-methylcyclohexane-1,2-dicarboxylate, dihexyl 4-methylcyclohexane-1,2-dicarboxylate, diheptyl 4-methylcyclohexane-1,2-dicarboxylate, dioctyl 4-methylcyclohexane-1,2-dicarboxylate, di-2-ethylhexyl 4-methylcyclohexane-1,2-dicarboxylate, didecyl 4-methylcyclohexane-1,2-dicarboxylate, diethyl 5-methylcyclohexane-1,3-dicarboxylate, diisobutyl 5-methylcyclohexane-1,3-dicarboxylate, diethyl 3,4-dimethylcyclohexane-1,2-dicarboxylate, di-n-propyl 3,4-dimethylcyclohexane-1,2-dicarboxylate, diisopropyl 3,4-dimethylcyclohexane-1,2-dicarboxylate, di-n-butyl 3,4-dimethylcyclohexane-1,2-dicarboxylate, diisobutyl 3,4-dimethylcyclohexane-1,2-dicarboxylate, dihexyl 3,4-dimethylcyclohexane-1,2-dicarboxylate, diheptyl 3,4-dimethylcyclohexane-1,2-dicarboxylate, dioctyl 3,4-dimethylcyclohexane-1,2-dicarboxylate, di-2-ethylhexyl 3,4-dimethylcyclohexane-1,2-dicarboxylate, didecyl 3,4-dimethylcyclohexane-1,2-dicarboxylate, diethyl 3,6-dimethylcyclohexane-1,2-dicarboxylate, di-n-propyl 3,6-dimethylcyclohexane-1,2-dicarboxylate, diisopropyl 3,6-dimethylcyclohexane-1,2-dicarboxylate, di-n-butyl 3,6-dimethylcyclohexane-1,2-dicarboxylate, diisobutyl 3,6-dimethylcyclohexane-1,2-dicarboxylate, dihexyl 3,6-dimethylcyclohexane-1,2-dicarboxylate, diheptyl 3,6-dimethylcyclohexane-1,2-dicarboxylate, dioctyl 3,6-dimethylcyclohexane-1,2-dicarboxylate, di-2-ethylhexyl 3,6-dimethylcyclohexane-1,2-dicarboxylate, didecyl 3,6-dimethylcyclohexane-1,2-dicarboxylate, diethyl 3,6-diphenylcyclohexane-1,2-dicarboxylate, di-n-propyl 3,6-diphenylcyclohexane-1,2-dicarboxylate, diisopropyl 3,6-diphenylcyclohexane-1,2-dicarboxylate, di-n-butyl 3,6-diphenylcyclohexane-1,2-dicarboxylate, diisobutyl 3,6-diphenylcyclohexane-1,2-dicarboxylate, dihexyl 3,6-diphenylcyclohexane-1,2-dicarboxylate, dioctyl 3,6-diphenylcyclohexane-1,2-dicarboxylate, didecyl 3,6-diphenylcyclohexane-1,2-dicarboxylate, diethyl 3-methyl-6-ethylcyclohexane-1,2-dicarboxylate, di-n-propyl 3-methyl-6-ethylcyclohexane-1,2-dicarboxylate, diisopropyl 3-methyl-6-ethylcyclohexane-1,2-dicarboxylate, di-n-butyl 3-methyl-6-ethylcyclohexane-1,2-dicarboxylate, diisobutyl 3-methyl-6-ethylcyclohexane-1,2-dicarboxylate, dihexyl 3-methyl-6-ethylcyclohexane-1,2-dicarboxylate, diheptyl 3-methyl-6-ethylcyclohexane-1,2-dicarboxylate, dioctyl 3-methyl-6-ethylcyclohexane-1,2-dicarboxylate, di-2-ethylhexyl 3-methyl-6-ethylcyclohexane-1,2-dicarboxylate, didecyl 3-methyl-6-ethylcyclohexane-1,2-dicarboxylate, diethyl 3-methyl-6-ethylcyclohexane-1,2-dicarboxylate, di-n-propyl 3-methyl-6-ethylcyclohexane-1,2-dicarboxylate, diisopropyl 3-methyl-6-ethylcyclohexane-1,2-dicarboxylate, di-n-butyl 3-methyl-6-ethylcyclohexane-1,2-dicarboxylate, diisobutyl 3-methyl-6-ethylcyclohexane-1,2-dicarboxylate, dihexyl 3-methyl-6-ethylcyclohexane-1,2-dicarboxylate, diheptyl 3-methyl-6-ethylcyclohexane-1,2-dicarboxylate, dioctyl 3-methyl-6-ethylcyclohexane-1,2-dicarboxylate, di-2-ethylhexyl 3-methyl-6-ethylcyclohexane-1,2-dicarboxylate, didecyl 3-methyl-6-ethylcyclohexane-1,2-dicarboxylate, diethyl 3-methyl-6-n-propylcyclohexane-1,2-dicarboxylate, di-n-propyl 3-methyl-6-n-propylcyclohexane-1,2-dicarboxylate, diisopropyl 3-methyl-6-n-propylcyclohexane-1,2-dicarboxylate, di-n-butyl 3-methyl-6-n-propylcyclohexane-1,2-dicarboxylate, diisobutyl 3-methyl-6-n-propylcyclohexane-1,2-dicarboxylate, dihexyl 3-methyl-6-n-propylcyclohexane-1,2-dicarboxylate, diheptyl 3-methyl-6-n-propylcyclohexane-1,2-dicarboxylate, dioctyl 3-methyl-6-n-propylcyclohexane-1,2-dicarboxylate, di-2-ethylhexyl 3-methyl-6-n-propylcyclohexane-1,2-dicarboxylate, dodecyl 3-methyl-6-n-propylcyclohexane-1,2-dicarboxylate, diethyl 3-hexylcyclohexane-1,2-dicarboxylate, diisobutyl 3-hexylcyclohexane-1,2-dicarboxylate, diethyl 3,6-dihexylcyclohexane-1,2-dicarboxylate, and diisobutyl 3-hexyl-6-pentylcyclohexane-1,2-dicarboxylate; and the external electron donor compound is diethyl adipate, diethyl pimelate, diethyl sebacate, triacetin, 1,5-pentanediol diacetate, diethyl-4-oxopimelate, or diethyleneglycol diacetate. For instance, the non-phthalate catalyst system uses one of the above-listed compounds as the internal electron donor compound, and triacetin or diethyl-4-oxopimelate as the external electron donor compound. In these embodiments, the polymer prepared according to the process of the invention has an improved isotacticity. an improved hydrogen response characterized by melt flow rate, and in some cases an increased gas phase activity and/or broadened molecular weight distribution. Surprisingly, the polymer prepared by the non-phthalate catalyst system described in this invention, with the non-silane external donors, can have improved hydrogen response and isotacticity at the same time. This is surprising behavior because, in a typical Ziegler-Natta catalyst system, the external donors that increase hydrogen response (i.e., characterized by MFR) mostly decrease isotacticity (i.e., characterized by increased % XS).

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are for illustrative purposes only and are not intended to limit, in any way, the scope of the present invention.

Materials & Procedures

Table 1 lists the phthalate catalysts tested as reference systems (or comparative examples).

TABLE 1

Phthalate catalysts tested as reference systems:

| Comparative Catalyst Example | Internal Donor |
|---|---|
| 1 | Diisobutylphthalate |
| 2 | Diisobutylphthalate |
| 3 | Diisobutylphthalate |
| 4 | Di-n-butylphthalate |

The alkoxysilanes used as reference systems in the comparative examples were C-donor (cyclohexylmethyl dimethoxysilane), D-donor (dicyclopentyl dimethoxysilane), P-donor (diisopropyl dimethoxysilane), and DIBS (diisobutyl dimethoxysilane).

Table 2 lists the non-phthalate procatalysts falling within the scope of this invention, listed below as Catalyst Example Nos. 1-5.

TABLE 2

Non-phthalate catalysts tested

| Catalyst Example No. | Internal Donor |
|---|---|
| 1 | 9,9-bis(methoxymethyl)fluorene ["Diether"] |
| 2 | 1,8-Napthyl dibenzoate |
| 3 | Cyclohexanedicarboxylate ester |
| 4 | Cyclohexanedicarboxylate ester |
| 5 | Cyclohexanedicarboxylate ester |

Structures of the non-silane aliphatic ester external donors, tested in combination with Catalyst Example Nos. 1-5, are shown below.

Diesters:

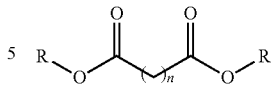

Diethyl malonate (n = 1, R = ethyl)
Diethyl glutarate (n = 3, R = ethyl)
Diethyl adipate (n = 4, R = ethyl)
Diisopropyl adipate (n = 4, R = isopropyl)
Dibutyl adipate (n = 4, R = n-butyl or isobutyl)
Bis (2-ethylhexyl) adipate (n = 4, R = 2-ethylhexyl)
Diethyl pimelate (n = 5, R = ethyl)
Diethyl azelate (n = 7, R = ethyl)
Diethyl sebacate (n = 8, R = ethyl)
Bis(2,2,6,6-tetramethyl-4-piperidyl) sebacate
(Tinuvin ® 770) (n = 8, R = 2,2,6,6-tetramethyl-4-piperidyl)

Triester:

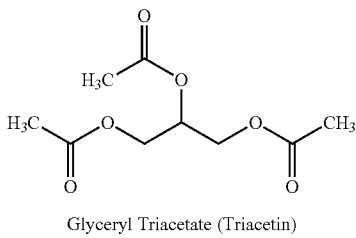

Glyceryl Triacetate (Triacetin)

Diacetates:

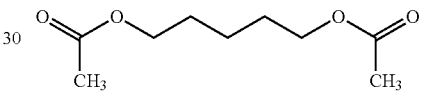

1,5-Pentanediol Diacetate (PDOA)

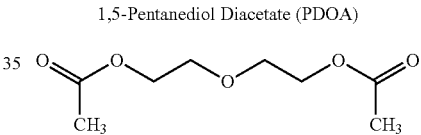

Diethyleneglycol diacetate (DEGA)

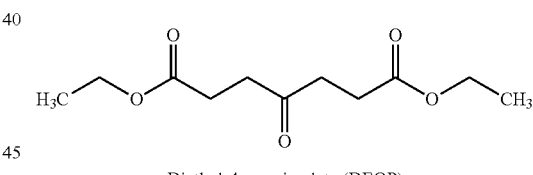

Diethyl-4-oxopimelate (DEOP)

Polymerizations were carried out in either a 1- or 2-gallon autoclave reactor in bulk liquid propylene (2000 grams in 1 gallon, 3000 grams in 2 gallon). Polymerization temperature and the amount of hydrogen added varied. Prior to the polymerization, triethylaluminum (TEAL), external donor, and procatalysts (including the internal donors) were injected to the reactor sequentially at room temperature and low pressure (<5 psig). Propylene and hydrogen were then added, and the reactor temperature was increased to the desired set point.

Impact copolymers were made by sequential bulk homopolymerization and gas phase copolymerization in a 2 gallon reactor. After the homopolymerization stage (at 75° C.), the reactor was depressured and purged with $N_2$ for 15 minutes before feeding ethylene, propylene, and hydrogen gas into the reactor. The gases were fed continuously to the reactor and constant pressure was maintained using a back pressure regulator thus ensuring a constant gas ratio. The gas phase copolymerization conditions were: 80° C., 140 psi, and molar ratios of the components in the gas phase are: ethylene/(ethylene+propylene)=0.43; and $H_2$/ethylene=0.067.

Molecular weight distribution of the polymers was measured by either GPC ($M_w/M_n$) or dynamic rheology (Polydispersity Index—PI). Polymer isotacticity was measured by xylene fractionation (% XS) or 500 MHz $^{13}C$ NMR (Bruker). DSC thermal fractionation was carried out by heating a sample to 200° C. at 10° C./minute, equilibrating for two hours, and then lowering the temperature by 10° C. increments to 120° C. The sample was allowed to equilibrate for two hours at each successive temperature. At the end of this cycle, the sample was heated up to 200° C. at 10° C./minute, and the melting endotherm was measured.

Results and Discussion

The different phthalate and non-phthalate procatalyst systems listed in Table 1 and Table 2, respectively, were analyzed with conventional alkoxysilane external donors and analyzed in Table 3 and Table 4, respectively, below.

Unlike phthalate-based catalysts, most non-phthalate catalysts are not strongly influenced by the type of alkoxysilane external donor used. This is illustrated in Table 4 for several different non-phthalate systems. Note that the ranges of MFR and % XS are much narrower for the phthalate procatalysts in Table 3 than for the non-phthalate procatalysts in Table 4.

TABLE 3

The phthalate procatalysts with conventional alkoxysilane external donors

| Comparative Catalyst Example No. | External Donor | kg Polypropylene/ g Procatalyst | MFR | % XS |
|---|---|---|---|---|
| 1[1] | C-donor | 35 | 80 | 4.0 |
|  | P-donor | 33 | 70 | 3.0 |
|  | D-donor | 30 | 25 | 2.7 |
| 1[2] | C-donor | 31 | 120 | 3.3 |
|  | P-donor | 34 | 100 | 2.9 |
|  | D-donor | 38 | 40 | 2.8 |
| 2[2] | C-donor | 34 | 100 | 3.0 |
|  | P-donor | 40 | 80 | 2.5 |
|  | D-donor | 44 | 25 | 2.0 |
| 3[3] | C-donor | 38 | 8 | 2.6 |
|  | P-donor | 36 | 3 | 2.2 |
|  | D-donor | 35 | 2 | 2.2 |
|  | DIBS | 34 | 6 | 3.5 |
| 3[4] | C-donor | 38 | 20 | 2.7 |
|  | P-donor | 39 | 10 | 2.1 |
|  | DIBS | 39 | 20 | 2.7 |

[1]2-gallon reactor, 70° C., 3.5 g $H_2$, ratio of donor/Ti compound = 10
[2]2-gallon reactor, 75° C., 4.75 g $H_2$, ratio of donor/Ti compound = 10
[3]1-gallon reactor, 75° C., 0.6 g $H_2$, ratio of donor/Ti compound = 10
[4]1-gallon reactor, 75° C., 0.9 g $H_2$, ratio of donor/Ti compound = 10

TABLE 4

The non-phthalate procatalysts (see Table 2 for internal donors for each example) with conventional alkoxysilane external donors (1-gallon reactor, 75° C., ratio of donor/Ti compound = 10)

| Catalyst Example | External Donor | kg Polypropylene/ g Procatalyst | MFR | % XS |
|---|---|---|---|---|
| 1 | C-Donor | 40 | 45 | 1.4 |
|  | P-Donor | 40 | 50 | 1.5 |
|  | D-Donor | 39 | 50 | 1.4 |
| 2 | C-Donor | 47 | 4 | 2.0 |
|  | P-Donor | 44 | 9 | 2.0 |
|  | D-Donor | 43 | 8 | 1.7 |
| 3 | C-Donor | 33 | 20 | 2.4 |
|  | P-Donor | 33 | 30 | 2.5 |
|  | D-Donor | 30 | 15 | 2.4 |
| 4 | C-Donor | 29 | 6 | 2.4 |
|  | P-Donor | 30 | 8 | 2.2 |
| 5 | C-Donor | 35 | 28 | 2.9 |
|  | D-Donor | 37 | 24 | 2.7 |

The effects of non-silane aliphatic diester external donors on different phthalate and non-phthalate procatalyst systems listed in Table 2 were analyzed. As shown in results below, each of these non-phthalate procatalysts had a particular deficiency that could not be influenced by alkoxysilanes, but were influenced by the new external donors.

Example No. 2 Procatalyst

Example No. 2 procatalyst is a non-phthalate catalyst containing 1,8-napthyl dibenzoate as an internal donor (see U.S. Pat. No. 8,003,558, which is incorporated herein by reference in its entirety). With typical alkoxysilane external donors (C, D, and P), Example No. 2 procatalyst had a significantly lower hydrogen response compared to a phthalate catalyst (Comparative Example 4) (see FIG. 1). Furthermore, FIG. 1 also shows that the type of alkoxysilane external donor has very little influence on the hydrogen response of Example No. 2 procatalyst.

Figure 1:
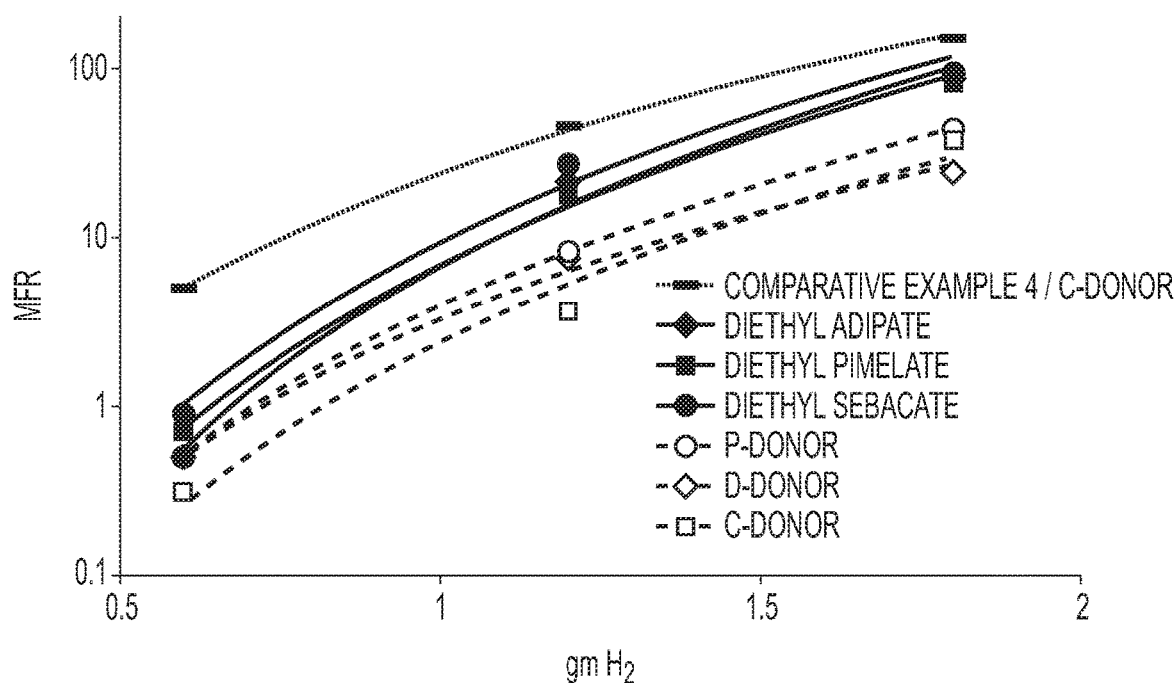
FIG. 1 is a graph showing the hydrogen responses of polymers prepared with Example No. 2 procatalyst (non-phthalate) in combination with a conventional alkoxysilane external donor and non-silane aliphatic diester external donors (1-gallon reactor, 75° C., ratio of donor/Ti compound=10), as compared to a phthalate procatalyst in combination with a conventional alkoxysilane external donor.

A series of non-silane aliphatic diester molecules were tested as external donors to improve the hydrogen response of Example No. 2 procatalyst. The results are shown in FIG. 1, Table 5.2, and Table 5.3. Table 5.1 illustrates the Example No. 2 procatalyst with varied Do/Ti ratios (1-gallon reactor, at 75° C., 1.8 gm $H_2$). While the aliphatic diesters somewhat decreased the catalyst activity, the hydrogen response gap between Example No. 2 procatalyst (non-phthalate) and Comparative Example 4 procatalyst (phthalate) was significantly reduced, especially at higher hydrogen levels. In addition, the polymers produced using the non-silane aliphatic diester external donors had a higher isotacticity (i.e., lower % XS) than those produced with the conventional alkoxysilane external donors at the same donor level.

At least some of the activity appeared to be recovered at a lower ratio of donor/Ti compound. Therefore, lowering the ratio of donor/Ti compound may be desirable to provide an improved performance comparable to conventional alkoxysilane external donors. Lowering the ratio of donor/Ti compound may also result in lower donor residues in the final product as well as providing an economic advantage over conventional alkoxysilane external donors.

TABLE 5.1

Example No. 2 procatalyst with varied Do/Ti ratios (1-gallon reactor, at 75° C., 1.8 gm $H_2$)

| Donor | Do/Ti | kg Polypropylene/ g Procatalyst |
|---|---|---|
| P-donor | 10 | 43 |
|  | 30 | 46 |

TABLE 5.1-continued

Example No. 2 procatalyst with varied Do/Ti ratios (1-gallon reactor, at 75° C., 1.8 gm H$_2$)

| Donor | Do/Ti | kg Polypropylene/ g Procatalyst |
|---|---|---|
| Diethyl Adipate | 2 | 49 |
| | 5 | 47 |
| | 10 | 33 |
| | 30 | 11 |

TABLE 5.2

Comparison of Example No. 2 procatalyst with conventional alkoxysilane external donors and with non-silane aliphatic diester external donors (2-gallon reactor, at 75° C., Do/Ti = 10, 4.0 gm H$_2$)

| External Donor | kg Polypropylene/ g Procatalyst | MFR | % XS |
|---|---|---|---|
| C-donor | 60 | 27 | 1.8 |
| Diethylene Gylcol Diacetate | 18 | 71 | 1.6 |
| 1,5-Pentanediol Diacetate | 27 | 54 | 1.4 |
| Triacetin | 43 | 45 | 2.6 |
| Diethyl Malonate | 73 | 44 | 3.6 |
| Diethyl 4-Oxopimelate | 40 | 41 | 1.8 |
| Diethyl Adipate | 35 | 34 | 1.6 |
| Tinuvin 770 | 56 | 25 | 2.0 |

TABLE 5.3

Comparison of Example No. 2 procatalyst with conventional alkoxysilane external donors and with non-silane aliphatic diester external donors (1-gallon reactor, at 75° C., Do/Ti = 10, 1.8 gm H$_2$)

| External Donor | kg Polypropylene/ g Procatalyst | MFR | % XS |
|---|---|---|---|
| C-Donor | 46 | 37 | 2.2 |
| D-Donor | 48 | 24 | 2.2 |
| P-Donor | 43 | 43 | 2.1 |
| Diethyl Sebacate | 31 | 94 | 1.5 |
| Diethyl Pimelate | 34 | 83 | 2.2 |
| Diethyl Adipate | 33 | 81 | 1.5 |
| Diisopropyl Adipate | 46 | 47 | 2.2 |
| Dibutyl Adipate | 42 | 44 | 2.1 |
| Diethyl Azelate | 41 | 42 | 2.0 |
| Diethyl Glutarate | 46 | 41 | 2.7 |
| Diethyl Malonate | 51 | 25 | 3.4 |
| Diisobutyl Adipate | 50 | 23 | 2.6 |
| Bis (2-ethylhexyl) Adipate | 56 | 18 | 2.9 |

Example No. 5 Procatalyst

Example No. 5 is a non-phthalate procatalyst based on a cyclohexanedicarboxylate internal donor (see U.S. Pat. Nos. 7,649,062 and 7,888,438, which are incorporated herein by reference in their entirety). Table 6 shows that Example No. 5 procatalyst with conventional alkoxysilane external donor provided somewhat lower MFR and higher xylene solubles than Comparative Example 1 procatalyst (phthalate). However, using diethyladipate as the external donor increased both the hydrogen response and isotacticity of Example No. 5 procatalyst. The increase in isotacticity was enough to make this non-phthalate catalyst system comparable to Comparative Example 1 (a phthalate catalyst system).

Similar to Example No. 2 procatalyst and aliphatic diester external donors, the catalyst activity when using Example No. 5 procatalyst with an aliphatic diester external donor was somewhat decreased compared to the conventional alkoxysilane external donor at the same donor/Ti compound ratio.

TABLE 6

Comparison of Example No. 5 procatalyst with conventional alkoxysilane external donors and with non-silane aliphatic diester external donors to Comparative Example 1 procatalyst (phthalate) with conventional alkoxysilane external donors (1-gallon reactor, 75° C., ratio of donor/ Ti compound = 10)

| Catalyst | External Donor | g H$_2$ | kg Polypropylene/ g Procatalyst | MFR | % XS |
|---|---|---|---|---|---|
| Example No. 5 | P-Donor | 1.8 | 54 | 60 | 3.3 |
| | | 1.2 | 52 | 19 | 3.6 |
| | | 0.6 | 45 | 3 | 4.0 |
| Example No. 5 | Diethyl Adipate | 1.8 | 38 | 290 | 2.5 |
| | | 1.2 | 36 | 78 | 2.5 |
| | | 0.6 | 32 | 8 | 3.2 |
| Comparative Example 1 | P-donor | 1.8 | 44 | 110 | 3.2 |
| | | 1.2 | 40 | 30 | 2.6 |
| | | 0.6 | 30 | 3 | 2.7 |

Example No. 3 Procatalyst

Example No. 3 is a non-phthalate procatalyst based on a cyclohexanedicarboxylate internal donor which produces very broad MWD products (see U.S. Pat. No. 8,729,189, which is incorporated herein by reference in its entirety).

A comparison of polymerization with Example No. 3 procatalyst in combination with a conventional alkoxysilane external donor and in combination with the non-silane aliphatic diester external donors is shown in Tables 7.1 and 7.2. Although the catalyst activity was decreased, the hydrogen response was in some cases increased by the diester external donors compared to the conventional alkoxysilane external donor, isotacticity was improved and the MWD remained the same or was broadened.

TABLE 7.1

Comparison of Example No. 3 procatalyst with a conventional alkoxysilane external donor and non-silane aliphatic diester external donors (1-gallon reactor, 75° C., ratio of donor/Ti compound = 10, 1.8 g H$_2$)

| External Donor | kg Polypropylene/ g Procatalyst | MFR | % XS |
|---|---|---|---|
| C-Donor | 32 | 71 | 2.4 |
| D-Donor | 34 | 58 | 2.1 |
| P-Donor | 33 | 140 | 2.6 |
| Triacetin | 18 | 148 | 2.6 |
| Diethyl 4-Oxopimelate | 15 | 146 | 2.2 |
| 1,5-Pentanediol Diacetate | 13 | 125 | 1.7 |
| Diethyl Malonate | 39 | 105 | 4.7 |
| Diethyl Adipate | 14 | 100 | 2.0 |
| Diethyl Sebacate | 16 | 96 | 2.0 |
| Diethyl Pimelate | 18 | 90 | 2.0 |
| Diethylene Gylcol Diacetate | 6 | 90 | 1.4 |
| Tinuvin 770 | 23 | 138 | 2.3 |

TABLE 7.2

Comparison of Example No. 3 procatalyst with a conventional alkoxysilane external donor and non-silane aliphatic diester external donors (1-gallon reactor, 75° C., ratio of donor/Ti compound = 10, 0.6 g H$_2$)

| External Donor | PI |
|---|---|
| P-Donor | 5.6 |
| Triacetin | 8.4 |
| Diethyl 4-Oxopimelate | 7.8 |
| 1,5-Pentanediol Diacetate | 7.8 |
| Diethyl Adipate | 7.6 |
| Diethyl Pimelate | 6.5 |
| Diethylene Gylcol Diacetate | 8.8 |
| Tinuvin 770 | 7.5 |

Figure 2:
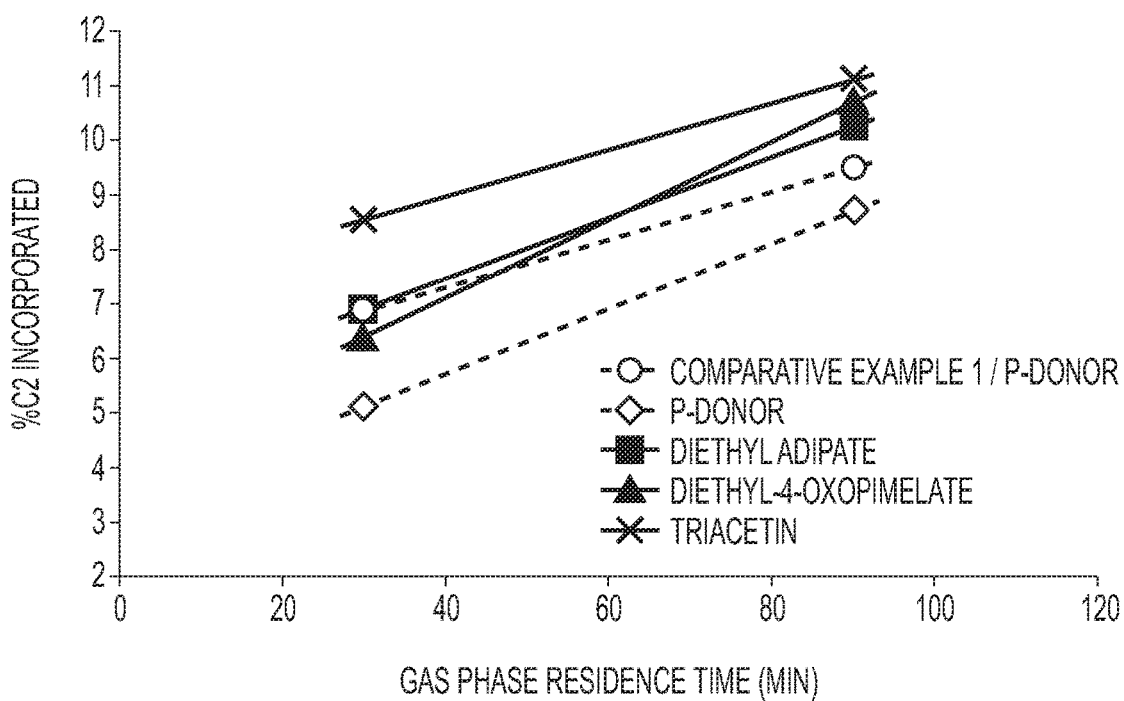
FIG. 2 is a graph showing the ethylene incorporation into an impact copolymer using Example No. 3 procatalyst (non-phthalate) in combination with a conventional alkoxysilane external donor and non-silane ester external donors, as compared to a phthalate procatalyst (Comparative Example 1) in combination with the conventional alkoxysilane external donor (2-gallon reactor, ratio of donor/Ti compound=10).

It was previously observed that Example No. 3 procatalyst has relatively low gas phase activity in the production of impact copolymer compared to the phthalate catalyst of Comparative Example 1. FIG. 2 illustrates the gap in gas phase production between Example No. 3 procatalyst (non-phthalate) and Comparative Example 1 procatalyst (phthalate) when using P-donor as the external donor. This shows that Example No. 3, procatalyst (non-phthalate) in combination with the conventional alkoxysilane external donors, does not have as good of a performance as the phthalate catalyst of Comparative Example 1 in the production of an impact copolymer.

Figure 3:
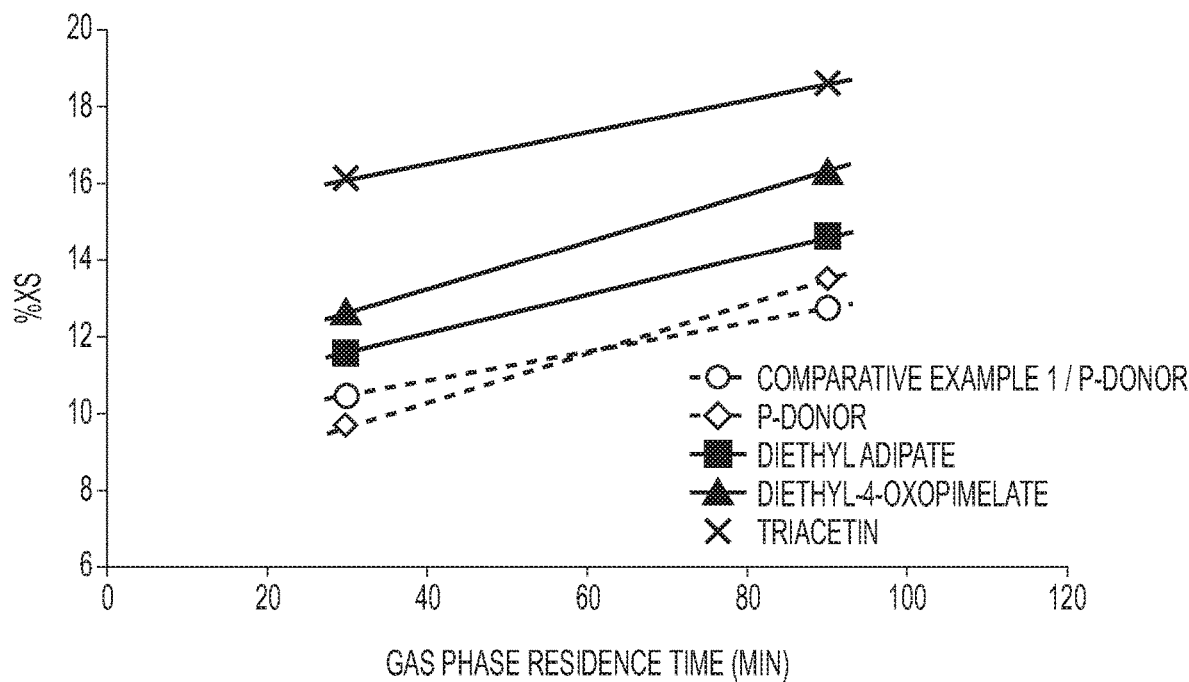
FIG. 3 is a graph showing the % XS in an impact copolymer using Example No. 3 procatalyst (non-phthalate)

However, when the non-silane aliphatic ester compounds were used with Example No. 3 procatalyst, much more promising gas phase production was observed (FIGS. 2 and 3). Diethyladipate external donor gave similar or slightly better ethylene incorporation than the phthalate/alkoxysilane system, and the triester donor (triacetin) improved the ethylene incorporation beyond that of the phthalate catalyst.

Example No. 1 Procatalyst

Example No. 1 is a commercial non-phthalate diether procatalyst (see U.S. Pat. No. 5,723,400, which is incorporated herein by reference in its entirety). Diether catalysts typically produce polypropylenes having lower crystallinity and stiffness than the phthalate catalysts, due to a narrower MWD and more regioirregular chain structure (Tables 8 and 10). Diether procatalysts also do not respond very differently to different alkoxysilane donors (see Tables 4 and 8).

Example No. 1 procatalyst was tested with alternative external donors to improve the attributes of the polymer product compared to the conventional alkoxysilane systems and to create products more similar to phthalate-based catalysts.

TABLE 8

Comparison of Example No. 1 procatalyst with conventional alkoxysilane external donors and non-silane aliphatic ester donors (1-gallon reactor, 75° C., ratio of donor/Ti Compound = 10, 1.2 gm H$_2$)

| External Donor | kg Polypropylene/ g Procatalyst | MFR | % XS |
|---|---|---|---|
| D-donor | 35 | 270 | 1.5 |
| C-donor | 36 | 290 | 1.7 |
| P-donor | 37 | 310 | 2.1 |
| Diethylene Gylcol Diacetate | 19 | 610 | 1.1 |
| Diethyl 4-Oxopimelate | 24 | 530 | 0.9 |
| 1,5-Pentanediol Diacetate | 25 | 490 | 0.9 |
| Triacetin | 31 | 470 | 1.5 |

One particular advantage of the alternative external donors with Example No. 1 procatalyst is the increase in the isotacticity of polymers, while the polydispersity index (PI) appeared to be essentially unchanged (Table 9). Thus, these new donors can modify the polymer structure in a way that differs from conventional alkoxysilane donors.

TABLE 9

Comparison of Example No. 1 procatalyst with conventional alkoxysilane external donors and non-silane aliphatic ester external donors (1-gallon reactor, 75° C., ratio of donor/Ti Compound = 10, 0.6 gm H$_2$)

| External Donor | kg Polypropylene/ g Procatalyst | MFR | % XS | PI |
|---|---|---|---|---|
| D-donor | 36 | 3.2 | 1.3 | 3.4 |
| C-Donor | 37 | 3.5 | 1.7 | — |
| P-Donor | 47 | 2.3 | 1.8 | — |
| Triacetin | 27 | 25 | 1.1 | 3.3 |
| Diethylene Gylcol Diacetate | 14 | 13 | 1.1 | 3.7 |
| Diethyl 4-Oxopimelate | 21 | 9 | 1.4 | 3.4 |
| 1,5-Pentanediol Diacetate | 18 | 7 | 1.0 | 3.7 |

The positive effect of the alternative donors on the hydrogen response of Example No. 1 procatalyst is illustrated in FIG. 4. As shown in FIG. 4, the new external donors in combination with the diether procatalysts produced a higher MFR product, which can lead to the production of a wider range of products than currently possible with conventional alkoxysilane external donors.

The above results show that aliphatic di- and tri-ester donors appeared to improve both hydrogen response and isotacticity at the same time. This is a desirable and novel behavior compared to the conventional response of the Ziegler-Natta procatalysts to the external donors. Typically, external donors that increase MFR also decrease isotacticity (increase % XS).

Compared to conventional alkoxysilane external donors, a relatively lower activity is seen at the same donor/Ti compound with the diester external donors. However, at least some of the activity appeared to be recovered at a lower donor/Ti compound. Therefore, lowering the ratio of donor/Ti compound may be desirable to provide an improved performance comparable to conventional alkoxysilane external donors. Lowering the ratio of donor/Ti compound may also result in lower donor residues in the final product as well as providing an economic advantage over conventional alkoxysilane external donors.

The results of the new aliphatic ester external donors in combination with the non-phthalate procatalyst are surprising as the phthalate catalysts typically do not respond well to these non-silane aliphatic ester external donors. As shown in Table 10, when these non-silane aliphatic ester external donors in combination with the phthalate procatalyst, the catalyst activity was dramatically reduced and both the MFR and % XS were significantly increased.

TABLE 10

Comparison of the phthalate procatalyst of Comparative Example 1 with a conventional alkoxysilane external donor and a non-silane aliphatic diester external donor (1-gallon reactor, 75° C., ratio of donor/Ti Compound = 10)

| External Donor | g H$_2$ | kg Polypropylene/ g Procatalyst | MFR | % XS |
|---|---|---|---|---|
| P-Donor | 1.8 | 44 | 110 | 3.2 |
|  | 1.2 | 40 | 30 | 2.6 |
|  | 0.6 | 30 | 3 | 2.7 |
| Diethyl Adipate | 1.8 | 6 | 1000 | 4.5 |
|  | 1.2 | 5 | 400 | 5.1 |
|  | 0.6 | 4 | 70 | 6.8 |

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

The invention claimed is:

1. A non-phthalate catalyst system for olefin polymerization, comprising:
(a) a solid Ziegler-Natta catalyst composition comprising a transition metal, a Group 2 metal, and one or more halogens; and
one or more internal electron donor compounds having the structure of a diester compound having a formula of

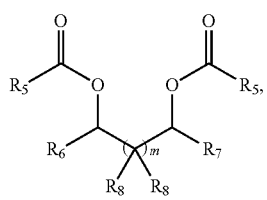

(II)

wherein:
each $R_5$ is independently a $C_1$ to $C_{18}$ hydrocarbyl group which can optionally form one or more saturated or unsaturated mono- or poly-cyclic structures;
each of $R_6$ and $R_7$ is independently H or a $C_1$ to $C_{18}$ hydrocarbyl group; or, $R_6$ and $R_7$ together form one or more saturated or unsaturated mono- or poly-cyclic structures;
each $R_8$ is independently absent, H, or a $C_1$ to $C_{18}$ hydrocarbyl group;
m is 0 or 1;
wherein each of $R_5$, $R_6$, $R_7$, and $R_8$, can contain one or more heteroatoms that replace one or more carbon atoms in the hydrocarbyl group, wherein the one or more heteroatoms are selected from the group consisting of halogens, P, N, O, S, and Si; and
(b) one or more external electron donor compounds selected from the group consisting of:

i) a triester compound having a formula of

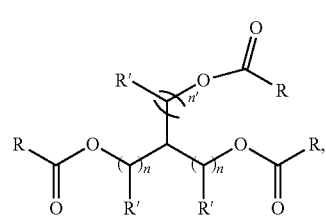

(V)

and ii) an oxo-substituted diester compound having a formula of

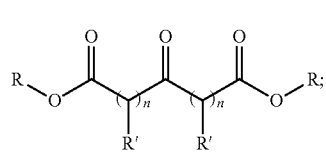

(VII)

wherein:
X is CH$_2$ or O,
each R is independently a $C_1$-$C_{10}$ hydrocarbyl group,
each R' is independently H or R,
each n is independently an integer from 1 to 4, and
n' is an integer from 0 to 4.

2. The non-phthalate catalyst system of claim 1, wherein the transition metal is titanium, the Group 2 metal is magnesium, and the halogen is chloride.

3. The non-phthalate catalyst system of claim 1, wherein the catalyst system further comprises an organoaluminum cocatalyst selected from the group consisting of alkylaluminum, alkylaluminum hydride, alkylaluminum halide, and alkylaluminum alkoxide.

4. The non-phthalate catalyst system of claim 1, wherein the internal electron donor compound is a diester compound having a formula of:

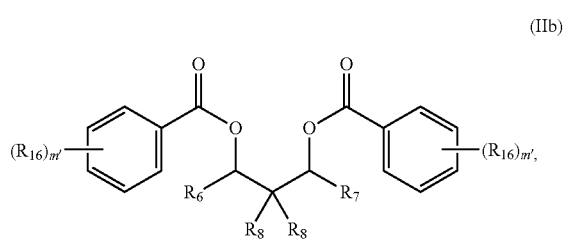

(IIb)

wherein each $R_{16}$ is independently H, halogen, or a $C_1$ to $C_{18}$ hydrocarbyl group which can optionally form one or more saturated or unsaturated cyclic structures with the phenyl group it attaches to, and can contain one or more heteroatoms that replace one or more carbon atoms in the hydrocarbyl group, wherein the one or more heteroatoms are selected from the group consisting of halogens, P, N, O, S, and Si; and each m' is independently an integer from 0 to 5.

5. The non-phthalate catalyst system of claim 1, wherein the internal electron donor compound is a diester compound having a formula of:

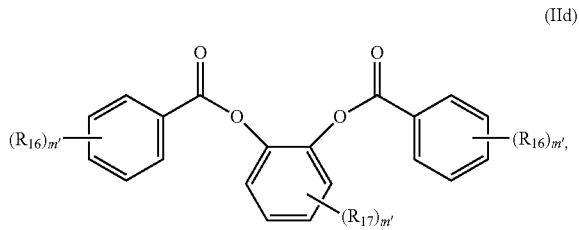

(IId)

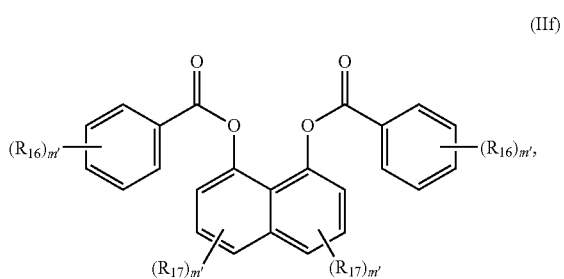

(IIf)

wherein each of $R_{16}$ and $R_{17}$ is independently H, halogen, or a $C_1$ to $C_{18}$ hydrocarbyl group which can optionally form one or more saturated or unsaturated cyclic structures with the phenyl group it attaches to, and can contain one or more heteroatoms that replace one or more carbon atoms in the hydrocarbyl group, wherein the one or more heteroatoms are selected from the group consisting of halogens, P, N, O, S, and Si; and each m' is independently an integer from 0 to 5.

6. The non-phthalate catalyst system of claim 5, wherein each m' is 0-3, and each of $R_{16}$ and $R_{17}$ is independently H, halogen, a $C_1$-$C_6$ alkyl, $C_1$-$C_6$ alkoxy, phenyl, $C_7$-$C_{12}$ aralkyl, or $C_7$-$C_{12}$ alkylaryl.

7. The non-phthalate catalyst system of claim 1, wherein the internal electron donor compound is a diester compound having a formula of:

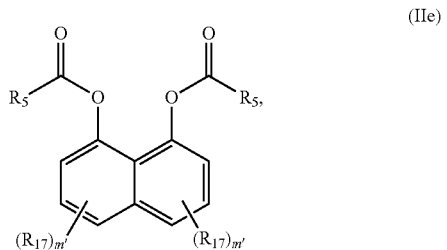

(IIe)

wherein:
  each m' is 0-3;
  each $R_{17}$ is independently H, halogen, or a $C_1$ to $C_{18}$ hydrocarbyl group which can optionally form one or more saturated or unsaturated cyclic structures with the phenyl group it attaches to, and can contain one or more heteroatoms that replace one or more carbon atoms in the hydrocarbyl group, wherein the one or more heteroatoms are selected from the group consisting of halogens, P, N, O, S, and Si; and
  each $R_5$ is independently a $C_1$-$C_{10}$ alkyl, $C_2$-$C_{10}$ alkenyl, $C_5$-$C_6$ cycloalkyl, $C_5$-$C_6$ cycloalkenyl, aryl, or heteroaryl; each of these groups can be further substituted by halogen, $C_1$-$C_{10}$ alkyl, or $C_1$-$C_{10}$ alkoxy.

8. The non-phthalate catalyst system of claim 7, wherein the internal electron donor compound is a diester compound having a formula of:

wherein each of $R_{16}$ and $R_{17}$ is independently H, halogen, a $C_1$-$C_6$ alkyl, $C_1$-$C_6$ alkoxy, phenyl, $C_7$-$C_{12}$ aralkyl, or $C_7$-$C_{12}$ alkylaryl.

9. The non-phthalate catalyst system of claim 8, wherein the diester compound is selected from the group consisting of 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; and 1,8-naphthyl di-3,5-di-t-butylbenzoate.

10. The non-phthalate catalyst system of claim 7, wherein the diester compound is selected from the group consisting of

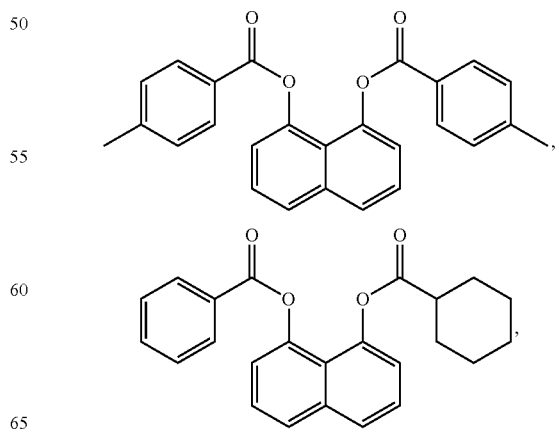

-continued
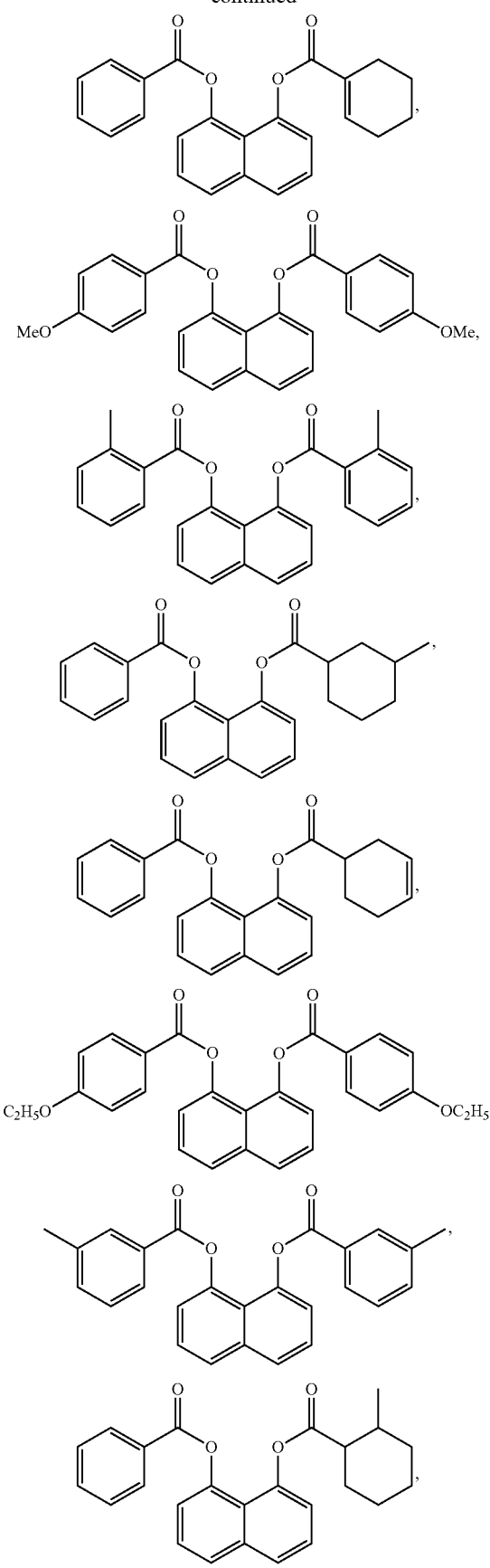
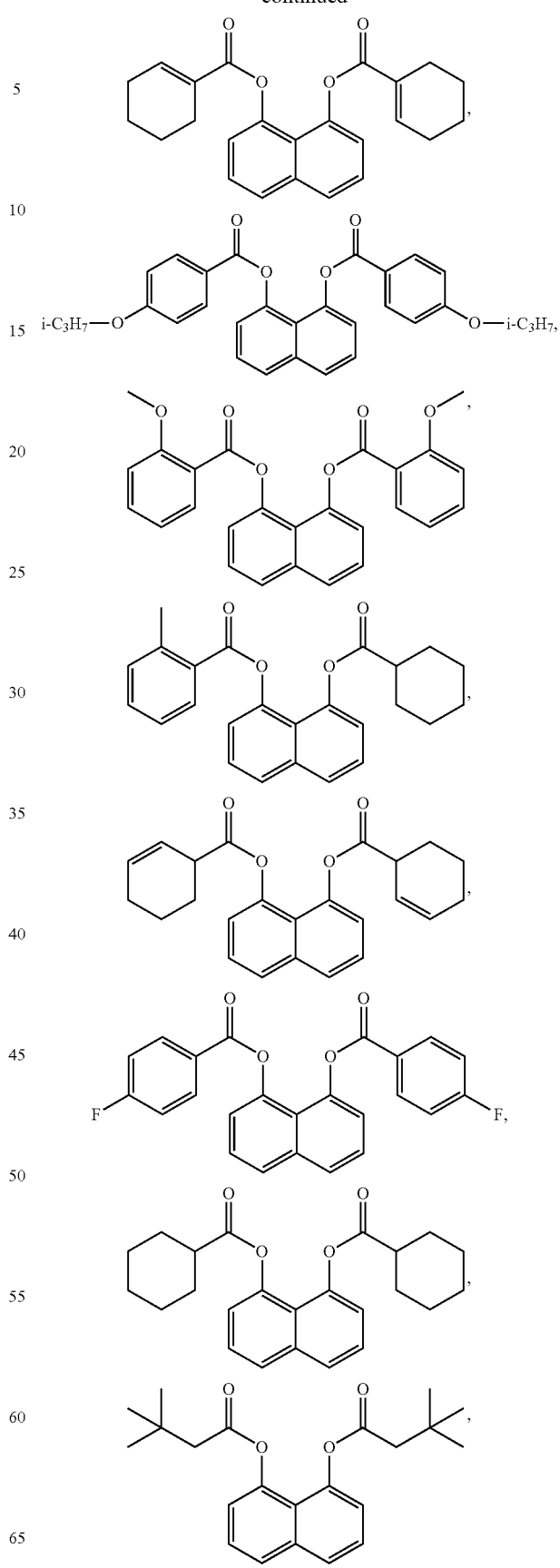

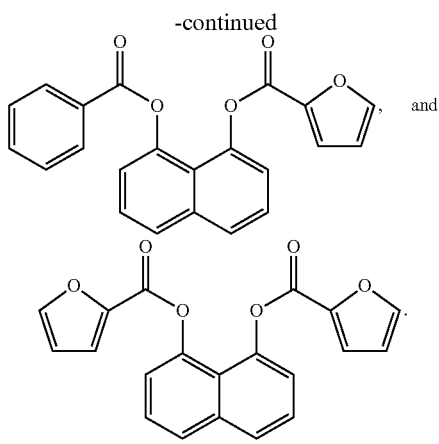

11. The non-phthalate catalyst system of claim 1, wherein the external electron donor is a triester compound.

12. The non-phthalate catalyst system of claim 11, wherein each R is a $C_1$ to $C_{10}$ alkyl, each R' is H or $CH_3$, each n is an integer from 1 to 2, and n' is an integer from 0 to 2.

13. The non-phthalate catalyst system of claim 12, wherein each R is methyl, each R' is H, each n is 1, and n' is 0.

14. A non-phthalate catalyst system for olefin polymerization, comprising:
(a) a solid Ziegler-Natta catalyst composition comprising a transition metal, a Group 2 metal, and one or more halogens; and
one or more internal electron donor compounds having the structure of a diester compound having a formula of

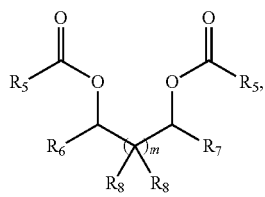

wherein:
each $R_5$ is independently a $C_1$ to $C_{18}$ hydrocarbyl group which can optionally form one or more saturated or unsaturated mono- or poly-cyclic structures;
each of $R_6$ and $R_7$ is independently H or a $C_1$ to $C_{18}$ hydrocarbyl group; or, $R_6$ and $R_7$ together form one or more saturated or unsaturated mono- or poly-cyclic structures;
each $R_8$ is independently absent, H, or a $C_1$ to $C_{18}$ hydrocarbyl group;
m is 0 or 1;
wherein each of $R_5$, $R_6$, $R_7$, and $R_8$ can contain one or more heteroatoms that replace one or more carbon atoms in the hydrocarbyl group, wherein the one or more heteroatoms are selected from the group consisting of halogens, P, N, O, S, and Si; and
(b) one or more external electron donor compounds, wherein the external electron donor is a diester compound having a formula of

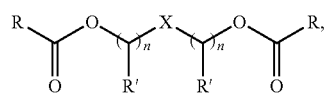

wherein:
X is $CH_2$ or O,
each R is independently a $C_1$-$C_{10}$ alkyl,
each R' is independently H or R, and
each n is independently an integer from 1 to 4.

15. The non-phthalate catalyst system of claim 14, wherein each R is a $C_1$ to $C_{10}$ alkyl, each R' is H or $CH_3$, and each n is an integer from 1 to 2.

16. The non-phthalate catalyst system of claim 15, wherein each R is methyl, each R' is H, and each n is 2.

17. The non-phthalate catalyst system of claim 1, wherein the external electron donor is an oxo-substituted diester compound.

18. The non-phthalate catalyst system of claim 17, wherein each R is a $C_1$ to $C_{10}$ alkyl, each R' is H or $CH_3$, and each n is an integer from 1 to 2.

19. The non-phthalate catalyst system of claim 18, wherein each R is methyl, each R' is H, and each n is 2.

20. A process for preparing a polyolefin, comprising:
polymerizing one or more olefins, in the presence of the non-phthalate catalyst system according to claim 1, under reaction conditions sufficient to form the polyolefin.

21. The process of claim 20, wherein in the non-phthalate catalyst system:
the internal electron donor compound is a diester compound having a formula of

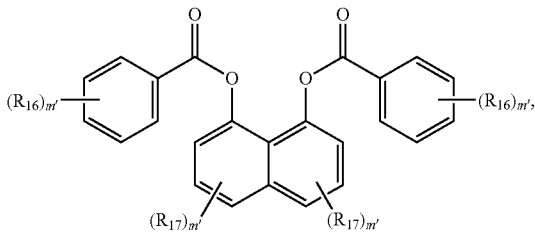

wherein each of $R_{16}$ and $R_{17}$ is independently H, halogen, a $C_1$-$C_6$ alkyl, $C_1$-$C_6$ alkoxy, phenyl, $C_7$-$C_{12}$ aralkyl, or $C_7$-$C_{12}$ alkylaryl.

22. The process of claim 21, wherein the internal electron donor compound is 1,8-naphthyl dibenzoate; and the external electron donor compound is triacetin or diethyl-4-oxopimelate.

23. The non-phthalate catalyst system of claim 14, wherein the transition metal is titanium, the Group 2 metal is magnesium, and the halogen is chloride.

24. The non-phthalate catalyst system of claim 14, wherein the catalyst system further comprises an organoaluminum cocatalyst selected from the group consisting of alkylaluminum, alkylaluminum hydride, alkylaluminum halide, and alkylaluminum alkoxide.

25. The non-phthalate catalyst system of claim 14, wherein the internal electron donor compound is a diester compound having a formula of:

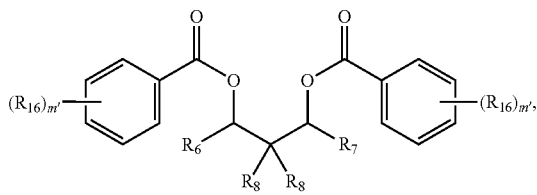

(IIb)

wherein each $R_{16}$ is independently H, halogen, or a $C_1$ to $C_{18}$ hydrocarbyl group which can optionally form one or more saturated or unsaturated cyclic structures with the phenyl group it attaches to, and can contain one or more heteroatoms that replace one or more carbon atoms in the hydrocarbyl group, wherein the one or more heteroatoms are selected from the group consisting of halogens, P, N, O, S, and Si; and each m' is independently an integer from 0 to 5.

26. The non-phthalate catalyst system of claim 14, wherein the internal electron donor compound is a diester compound having a formula of:

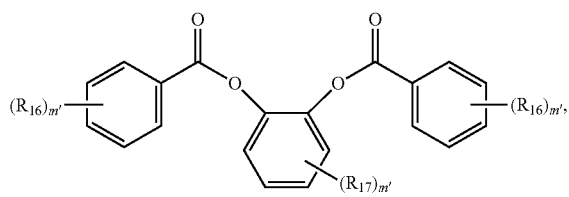

(IId)

wherein each of $R_{16}$ and $R_{17}$ is independently H, halogen, or a $C_1$ to $C_{18}$ hydrocarbyl group which can optionally form one or more saturated or unsaturated cyclic structures with the phenyl group it attaches to, and can contain one or more heteroatoms that replace one or more carbon atoms in the hydrocarbyl group, wherein the one or more heteroatoms are selected from the group consisting of halogens, P, N, O, S, and Si; and each m' is independently an integer from 0 to 5.

27. The non-phthalate catalyst system of claim 26, wherein each m' is 0-3, and each of $R_{16}$ and $R_{17}$ is independently H, halogen, a $C_1$-$C_6$ alkyl, $C_1$-$C_6$ alkoxy, phenyl, $C_7$-$C_{12}$ aralkyl, or $C_7$-$C_{12}$ alkylaryl.

28. The non-phthalate catalyst system of claim 14, wherein the internal electron donor compound is a diester compound having a formula of:

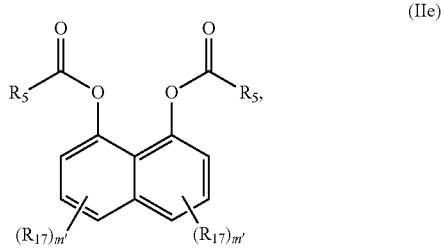

(IIe)

wherein:
each m' is 0-3;
each $R_{17}$ is independently H, halogen, or a $C_1$ to $C_{18}$ hydrocarbyl group which can optionally form one or more saturated or unsaturated cyclic structures with the phenyl group it attaches to, and can contain one or more heteroatoms that replace one or more carbon atoms in the hydrocarbyl group, wherein the one or more heteroatoms are selected from the group consisting of halogens, P, N, O, S, and Si; and
each $R_5$ is independently a $C_1$-$C_{10}$ alkyl, $C_2$-$C_{10}$ alkenyl, $C_5$-$C_6$ cycloalkyl, $C_5$-$C_6$ cycloalkenyl, aryl, or heteroaryl; each of these groups can be further substituted by halogen, $C_1$-$C_{10}$ alkyl, or $C_1$-$C_{10}$ alkoxy.

29. The non-phthalate catalyst system of claim 28, wherein the internal electron donor compound is a diester compound having a formula of:

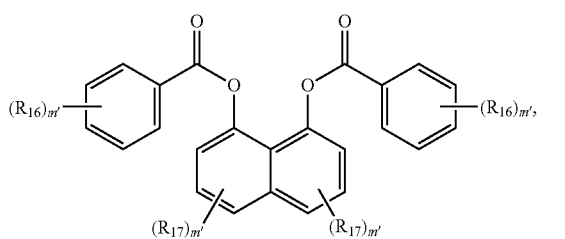

(IIf)

wherein each of $R_{16}$ and $R_{17}$ is independently H, halogen, a $C_1$-$C_6$ alkyl, $C_1$-$C_6$ alkoxy, phenyl, $C_7$-$C_{12}$ aralkyl, or $C_7$-$C_{12}$ alkylaryl.

30. The non-phthalate catalyst system of claim 29, wherein the diester compound is selected from the group consisting of 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; and 1,8-naphthyl di-3,5-di-t-butylbenzoate.

31. The non-phthalate catalyst system of claim 28, wherein the diester compound is selected from the group consisting of

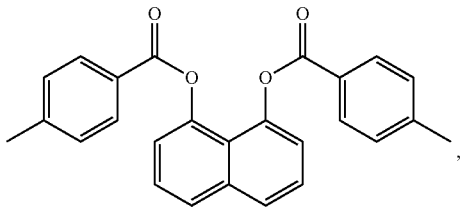

,

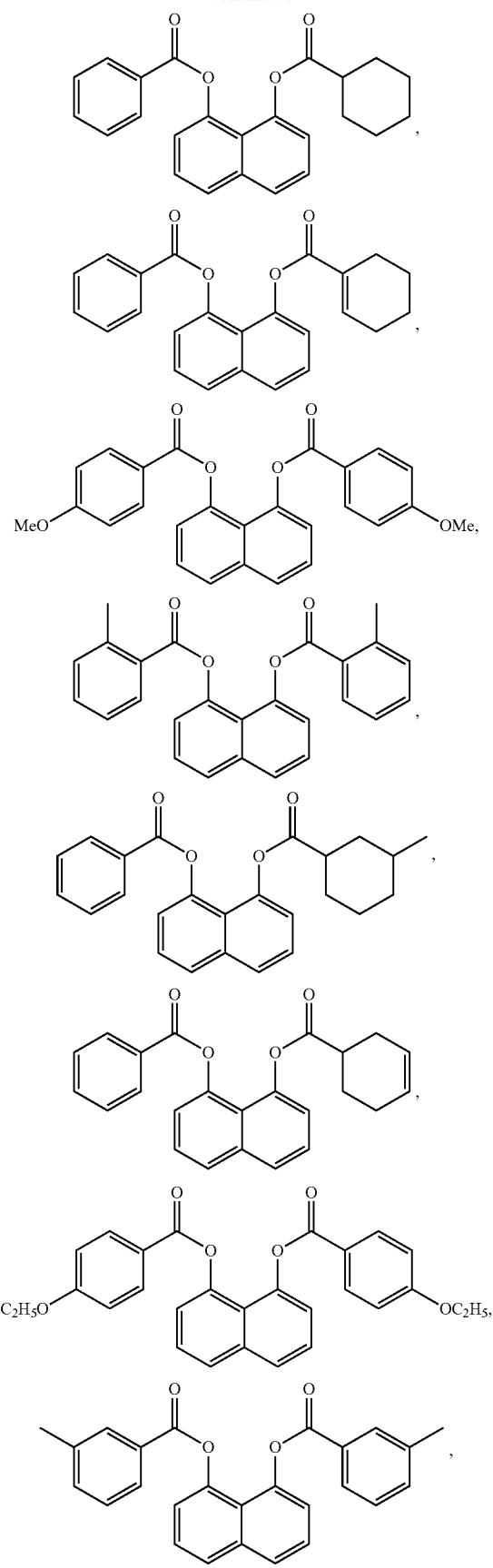
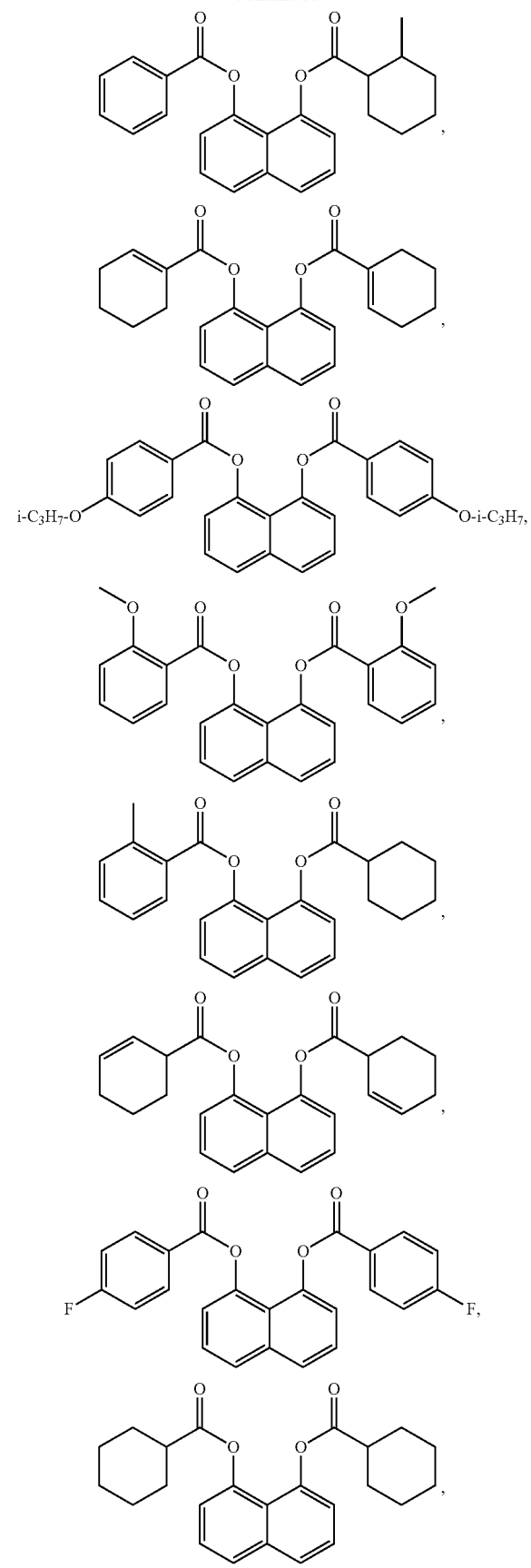

-continued

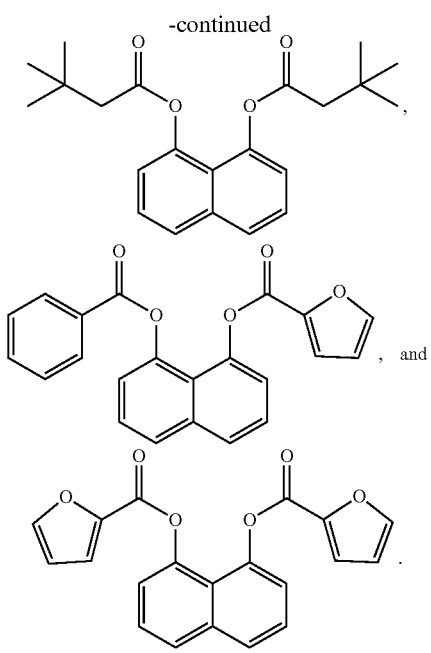

32. A process for preparing a polyolefin, comprising:
polymerizing one or more olefins, in the presence of the non-phthalate catalyst system according to claim 14, under reaction conditions sufficient to form the polyolefin.

33. The process of claim 32, wherein in the non-phthalate catalyst system:
the internal electron donor compound is a diester compound having a formula of (IIf)

wherein each of $R_{16}$ and $R_{17}$ is independently H, halogen, a $C_1$-$C_6$ alkyl, $C_1$-$C_6$ alkoxy, phenyl, $C_7$-$C_{12}$ aralkyl, or $C_7$-$C_{12}$ alkylaryl.

34. The process of claim 33, wherein the internal electron donor compound is 1,8-naphthyl dibenzoate; and the external electron donor compound is 1,5-pentanediol diacetate or diethyleneglycol diacetate.

* * * * *